US012573547B2

(12) United States Patent (10) Patent No.: US 12,573,547 B2
Shirouzu et al. (45) Date of Patent: Mar. 10, 2026

(54) THREE-PHASE REACTOR COMPRISING IRON-CORE UNITS AND COILS

(71) Applicant: FANUC CORPORATION, Yamanashi (JP)

(72) Inventors: Masatomo Shirouzu, Yamanashi (JP); Takuya Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 106 days.

(21) Appl. No.: 18/312,465

(22) Filed: May 4, 2023

(65) Prior Publication Data

US 2023/0274878 A1 Aug. 31, 2023

Related U.S. Application Data

(62) Division of application No. 16/864,952, filed on May 1, 2020, now Pat. No. 11,728,091, which is a division
(Continued)

(30) Foreign Application Priority Data

Jan. 28, 2016 (JP) ................................. 2016-014484
Aug. 18, 2016 (JP) ................................. 2016-160747

(51) Int. Cl.
*H01F 3/14* (2006.01)
*H01F 27/32* (2006.01)
(Continued)

(52) U.S. Cl.
CPC ............. *H01F 37/005* (2013.01); *H01F 3/14* (2013.01); *H01F 27/324* (2013.01); *H01F 37/00* (2013.01); *H02K 11/33* (2016.01)

(58) Field of Classification Search
CPC ........ H01F 37/005; H01F 3/14; H01F 27/324; H01F 37/00; H01F 27/263; H01F 27/2828; H01F 29/00; H01F 30/12; H02K 11/33
See application file for complete search history.

(56) References Cited

U.S. PATENT DOCUMENTS 1,098,664 A 6/1914 Dolivo
2,406,704 A * 8/1946 Alphonse ................ H01F 30/12
336/212
(Continued)

FOREIGN PATENT DOCUMENTS

CA 2942011 A1 9/2015
CN 202940648 U 5/2013
(Continued)

OTHER PUBLICATIONS

English Abstract and Machine Translation for Japanese Publication No. 2015-159657 A, published Sep. 3, 2015, 61 pgs.
(Continued)

*Primary Examiner* — Mang Tin Bik Lian
(74) *Attorney, Agent, or Firm* — Fredrikson & Byron, P.A.

(57) ABSTRACT

A three-phase reactor includes: an outer peripheral iron core; and at least three iron-core coils that come in contact with an inner surface of the outer peripheral iron core or are joined to the inner surface. The at least three iron-core coils include corresponding iron cores and corresponding coils wound around the iron cores, and gaps that can magnetically connect one iron-core coil of the at least three iron-core coils and an iron-core coil adjacent to the one iron-core coil to each other are formed between the one iron-core coil of the at least three iron-core coils and the iron-core coil adjacent to the one iron-core coil.

4 Claims, 34 Drawing Sheets

Related U.S. Application Data of application No. 15/400,066, filed on Jan. 6, 2017, now Pat. No. 10,748,703.

(51) Int. Cl.
*H01F 37/00* (2006.01)
*H02K 11/33* (2016.01)

(56) References Cited

U.S. PATENT DOCUMENTS

| | | | | |
|---|---|---|---|---|
| 4,156,897 A * | 5/1979 | Vigh | H02M 7/068 |
| | | | 336/215 |
| 4,912,618 A * | 3/1990 | Krinickas, Jr. | H02M 5/42 |
| | | | 363/64 |
| 5,379,207 A * | 1/1995 | Shah | H01F 30/14 |
| | | | 363/64 |
| 7,235,910 B2 * | 6/2007 | Decristofaro | H01F 1/15375 |
| | | | 310/216.065 |
| 8,653,931 B2 | 2/2014 | Xu et al. | |
| 9,613,745 B2 | 4/2017 | Shudarek | |
| 10,008,322 B2 * | 6/2018 | Bhide | H01F 37/00 |
| 2005/0030140 A1 | 2/2005 | Dahlgren et al. | |
| 2006/0087393 A1 | 4/2006 | Dahlgren et al. | |
| 2009/0261939 A1 * | 10/2009 | Shudarek | H01F 27/263 |
| | | | 336/212 |
| 2010/0079025 A1 | 4/2010 | Suzuki et al. | |
| 2010/0289366 A1 | 11/2010 | Komuro et al. | |
| 2012/0106210 A1 | 5/2012 | Xu et al. | |
| 2013/0162089 A1 | 6/2013 | Komuro et al. | |
| 2013/0187741 A1 * | 7/2013 | Goodrich | H01F 3/10 |
| | | | 336/170 |
| 2014/0035422 A1 * | 2/2014 | Mikami | H02K 15/03 |
| | | | 310/156.71 |
| 2015/0123479 A1 | 5/2015 | Kurita | |
| 2016/0125998 A1 | 5/2016 | Bhide et al. | |
| 2017/0040099 A1 * | 2/2017 | Bhide | H01F 27/245 |

FOREIGN PATENT DOCUMENTS

| | | | |
|---|---|---|---|
| CN | 203895234 U | 10/2014 | |
| CN | 105140002 A | 12/2015 | |
| DE | 102016010901 A1 | 3/2017 | |
| JP | 5373352 A | 6/1978 | |
| JP | 2203507 A | 8/1990 | |
| JP | 2007300700 A | 11/2007 | |
| JP | 2008177500 A | 7/2008 | |
| JP | 2010252539 A | 11/2010 | |
| JP | 2013074084 A | 4/2013 | |
| JP | 2015159657 A | 9/2015 | |
| WO | 2014033830 A1 | 3/2014 | |
| WO | 2015142354 A1 | 9/2015 | |

OTHER PUBLICATIONS

English Abstract and Machine Translation for Japanese Publication No. 2013-074084 A, published Apr. 22, 2013, 15 pgs.

English Abstract and Machine Translation for Japanese Publication No. 2010-252539 A, published Nov. 4, 2010, 44 pgs.

English Abstract and Machine Translation for Japanese Publication No. 2008-177500 A, published Jul. 31, 2008, 17 pgs.

English Abstract and Machine Translation for Japanese Publication No. 2007-300700 A, published Nov. 15, 2007, 14 pgs.

English Abstract and Machine Translation for Chinese Publication No. 203895234 U, published Oct. 22, 2014, 4 pgs.

English Abstract and Machine Translation for Chinese Publication No. 105140002 A, published Dec. 9, 2015, 8 pgs.

English Machine Translation for Japanese Publication No. JPS5373352 A, published Jun. 29, 1978, 5 pgs.

English Abstract and Machine Translation for Japanese Publication No. JPH2203507 A, published Aug. 13, 1990, 7 pgs.

Untranslated Notification of Reasons for Refusal issued by Japan Patent Office in corresponding Japanese Application No. 2016-160747, Jun. 5, 2018, 5 pgs.

English Machine Translation of Untranslated Notification of Reasons for Refusal issued by Japan Patent Office in corresponding Japanese Application No. 2016-160747, Jun. 5, 2018, 4 pgs.

Untranslated Decision to Grant issued by Japan Patent Office in corresponding Japanese Application No. 2016-160747, Nov. 13, 2018, 3 pgs.

English Machine Translation of Decision to Grant issued by Japan Patent Office in corresponding Japanese Application No. 2016-160747, Nov. 13, 2018, 3 pgs.

English Abstract for Chinese Publication No. CN202940648U, published May 15, 2013, 1 pg.

* cited by examiner

THREE-PHASE REACTOR COMPRISING IRON-CORE UNITS AND COILS

RELATED APPLICATIONS

This application is a divisional of U.S. application Ser. No. 16/864,952, filed May 1, 2020, which is a divisional of U.S. application Ser. No. 15/400,066, filed Jan. 6, 2017, which claims priority to Japanese Application No. 2016-160747, filed Aug. 18, 2016, and Japanese Application No. 2016-014484, filed Jan. 28, 2016, the teachings of which are herein incorporated by reference.

BACKGROUND OF THE INVENTION

Field of the Invention

The present invention relates to a three-phase reactor including iron-core units and coils.

Description of the Related Art

Ordinarily, three-phase reactors include three iron cores and three coils wound around the iron cores. Japanese Unexamined Patent Publication (Kokai) No. 2-203507 discloses a three-phase reactor including three coils placed side by side. International Publication No. WO 2014/033830 discloses that the corresponding central axes of plural coils are arranged around the central axis of a three-phase reactor. Japanese Unexamined Patent Publication (Kokai) No. 2008-177500 discloses a three-phase reactor including plural straight magnetic cores that are radially arranged, connecting magnetic cores that connect the straight magnetic cores, and coils that are wound around the straight magnetic cores and the connecting magnetic cores.

SUMMARY OF THE INVENTION

A three-phase alternating current passes through a coil in each phase of a three-phase reactor. In the three-phase reactor that is conventional (Japanese Unexamined Patent Publication (Kokai) No. 2-203507), the length of a magnetic path through which magnetism generated when currents pass through coils in two optional phases passes may depend on the combination of the phases. Accordingly, there has been a problem that even when three-phase alternating currents in equilibrium are passed through the corresponding phases of a three-phase reactor, the densities of magnetic fluxes passing through iron cores in the corresponding phases are different from each other, and inductances are also imbalanced.

In the three-phase reactor that is conventional (Japanese Unexamined Patent Publication (Kokai) No. 2-203507), it may be impossible to symmetrically arrange iron-core coils in corresponding phases. Therefore, magnetic fluxes generated from the iron-core coils cause imbalanced inductances. When inductances are imbalanced in a three-phase reactor as described above, it is impossible to ideally output a three-phase alternating current even if the three-phase alternating current is ideally inputted.

In the three-phase reactors that are conventional (Japanese Unexamined Patent Publication (Kokai) No. 2-203507 and International Publication No. WO 2014/033830), the dimensions of gaps (thicknesses of gaps) depend on the dimensions of a commercially available gap member. Therefore, the winding number and cross-sectional area of a coil may be limited by the dimension of a gap member when the structure of a three-phase reactor is determined. The precision of inductances in a three-phase reactor depends on the precision of the thickness of a gap member. Because the precision of the thickness of a gap member is commonly around ±10%, the precision of inductances in a three-phase reactor also depends thereon. It is also possible to produce a gap member having a desired dimension while the cost of the gap member is increased.

In order to assemble a three-phase reactor, a step of assembling the core members of the three-phase reactor on a one-by-one basis, and a step of connecting some core members to each other are preferably performed several times. Therefore, there is a problem that it is difficult to control the dimension of a gap. In addition, a manufacturing cost is increased by improving the precision of the thickness of a gap member.

A core member is ordinarily formed by layering plural steel sheets for layering. A three-phase reactor preferably has a portion in which core members come in contact with each other. In addition, it is preferable to alternately layer the steel sheets for layering in order to enhance the precision of the contact portion. Such operations have been very complicated.

Further, the three-phase reactors that are conventional (Japanese Unexamined Patent Publication (Kokai) No. 2-203507 and International Publication No. WO 2014/033830) have a problem that a magnetic field leaks out to an air area around a coil in such a three-phase reactor because the coil is exposed to the outside. The magnetic field that has leaked out can influence a heart pacemaker, and can heat a magnetic substance around such a three-phase reactor. In recent years, amplifiers, motors, and the like have tended to be driven by higher-frequency switching. Therefore, the frequency of high-frequency noise can also become higher. Thus, it is also conceivable that the influence of the magnetic field that has leaked out on the outside becomes greater.

Further, the three-phase reactors that are conventional (Japanese Unexamined Patent Publication (Kokai) No. 2-203507 and International Publication No. WO 2014/033830) have a problem that a magnetic flux that has leaked out of a gap causes an eddy-current loss in a coil, thereby increasing the loss of the coil, because the coil is arranged close to the gap. A method of making a structure in which the coil is located away from the gap can be provided in order to solve the problem. However, the method has a demerit that a weight and a cost are increased because the core and the winding diameter of the coil become large.

The problem that the inductances are imbalanced can be solved by enlarging only the gap of a central phase. However, a magnetic field is allowed to further leak out by enlarging the gap.

Further, in the reactors having the conventional structures (Japanese Unexamined Patent Publication (Kokai) No. 2-203507 and International Publication No. WO 2014/033830), the temperatures of a coil and a core have tended to easily become unbalanced because of high thermal resistance between the coil and the core. In order to eliminate the unbalance between the temperatures, the entire coil may be molded with resin to bring the coil into intimate contact with the core. However, there is a problem that a cost is increased. Further, in order to suppress noise generated from a gap, design can be performed such that a magnetic flux density is reduced, and molding with resin can be performed as described above. However, there is also a problem that a cost is increased.

Methods for solving the above-described problems of the imbalance in inductances, the leakage of a magnetic field due to a coil exposed to the outside, and a gap dimension also include such a technique as described in Japanese Unexamined Patent Publication (Kokai) No. 2008-177500. It is described that inductances can be offered by supplying a current to a control winding without disposing a gap in the technique. However, the technique has a problem that a control circuit for controlling a current passed through the control winding is demanded, whereby an unnecessary power is consumed by the control winding. Further, the technique also has a problem that a magnetic field generated from the control winding leaks out to an area around the control winding because the control winding is exposed to the outside.

The present invention was accomplished under such circumstances with an object to provide a three-phase reactor with gaps, which inhibits inductances from being imbalanced and a magnetic field from leaking out to the outside, and in which a control winding is unnecessary, and a loss caused by a leakage flux can be reduced.

In order to achieve the object described above, according to a first aspect of the present invention, there is provided a three-phase reactor including: an outer peripheral iron core; and at least three iron-core coils that come in contact with an inner surface of the outer peripheral iron core or are joined to the inner surface, wherein the at least three iron-core coils include corresponding iron cores and corresponding coils wound around the iron cores; and gaps that can magnetically connect one iron-core coil of the at least three iron-core coils and an iron-core coil adjacent to the one iron-core coil to each other are formed between the one iron-core coil of the at least three iron-core coils and the iron-core coil adjacent to the one iron-core coil.

According to a second aspect of the present invention, the number of the at least three iron-core coils is a multiple of 3 in the first aspect of the present invention.

According to a third aspect of the present invention, the iron cores of the at least three iron-core coils include plural iron-core units; and iron-core unit gaps that can magnetically connect the plural iron-core units are formed between the plural iron-core units in either the first or second aspect of the present invention.

According to a fourth aspect of the present invention, outer peripheral iron-core gaps that can magnetically connect the iron cores of the at least three iron-core coils and the outer peripheral iron core to each other are formed between the iron cores of the at least three iron-core coils and the outer peripheral iron core in any of the first to third aspects of the present invention.

According to a fifth aspect of the present invention, the outer peripheral iron core includes plural outer peripheral iron-core units in any of the first to fourth aspects of the present invention.

According to a sixth aspect of the present invention, outer peripheral iron-core unit gaps are formed between outer peripheral iron-core units, adjacent to each other, of the plural outer peripheral iron-core units in the fifth aspect of the present invention.

According to a seventh aspect of the present invention, the at least three iron-core coils are rotationally symmetrically arranged in any of the first to sixth aspects of the present invention.

According to an eighth aspect of the present invention, the three-phase reactor includes: a first set including at least three iron-core coils; and a second set including at least three other iron-core coils in any of the first to seventh aspects of the present invention.

According to a ninth aspect of the present invention, the three-phase reactor includes not less than three sets, each of which includes three iron-core coils in the eighth aspect of the present invention.

According to a tenth aspect of the present invention, a gap member, insulating paper, or resin which is a non-magnetic material is inserted or filled into the gaps of the three-phase reactor in any of the first to ninth aspects of the present invention.

According to an eleventh aspect of the present invention, a gap member, insulating material, or resin which is a non-magnetic material is filled into an inside of the outer peripheral iron core of the three-phase reactor in any of the first to ninth aspects of the present invention.

According to a twelfth aspect of the present invention, there is provided a three-phase reactor including: an outer peripheral iron core; and at least three iron-core coils that come in contact with an inner surface of the outer peripheral iron core or are joined to the inner surface, wherein the at least three iron-core coils include corresponding iron cores and corresponding coils wound around the iron cores; the three-phase reactor further includes inter-coil iron cores arranged between the at least three iron-core coils; and gaps that can magnetically connect the at least three iron-core coils and the inter-coil iron cores to each other are formed between the at least three iron-core coils and the inter-coil iron cores.

According to a thirteenth aspect of the present invention, each of the inter-coil iron cores includes two surfaces making an acute angle with each other; and the two surfaces face the corresponding iron-core coils across the corresponding gaps in the twelfth aspect of the present invention.

According to a fourteenth aspect of the present invention, the number of the at least three iron-core coils is a multiple of 3 in either the twelfth or thirteenth aspect of the present invention.

According to the fifteenth aspect of the present invention, the iron cores of the at least three iron-core coils include plural iron-core units; and iron-core unit gaps that can magnetically connect the plural iron-core units are formed between the plural iron-core units in any of the twelfth to fourteenth aspects of the present invention.

According to a sixteenth aspect of the present invention, outer peripheral iron-core gaps that can magnetically connect the iron cores of the at least three iron-core coils and the outer peripheral iron core are formed between the iron cores of the at least three iron-core coils and the outer peripheral iron core in any of the twelfth to fifteenth aspects of the present invention.

According to a seventeenth aspect of the present invention, the inter-coil iron cores include plural inter-coil iron-core units; and inter-coil iron-core unit gaps that can magnetically connect the plural inter-coil iron-core units are formed between the plural inter-coil iron-core units in any of the twelfth to sixteenth aspects of the present invention.

According to an eighteenth aspect of the present invention, the outer peripheral iron core includes plural outer peripheral iron-core units in any of the twelfth to seventeenth aspects of the present invention.

According to a nineteenth aspect of the present invention, outer peripheral iron-core unit gaps are formed between outer peripheral iron-core units, adjacent to each other, of the plural outer peripheral iron-core units, in the eighteenth aspect of the present invention.

According to a twentieth aspect of the present invention, the three iron-core coils are rotationally symmetrically arranged in any of the twelfth to nineteenth aspects of the present invention.

According to a twenty-first aspect of the present invention, the three-phase reactor includes: a first set including three iron-core coils; and a second set including three other iron-core coils in any of the twelfth to twentieth aspects of the present invention.

According to a twenty-second aspect of the present invention, the three-phase reactor includes not less than three sets, each of which includes three iron-core coils in the twenty-first aspect of the present invention.

According to a twenty-third aspect of the present invention, a gap member, insulating paper, or resin which is a non-magnetic material is inserted or filled into the gaps of the three-phase reactor in any of the twelfth to twenty-second aspects of the present invention.

According to a twenty-fourth aspect of the present invention, a gap member, insulating material, or resin which is a non-magnetic material is filled into an inside of the outer peripheral iron core of the three-phase reactor in any of the twelfth to twenty-second aspects of the present invention.

According to a twenty-fifth aspect of the present invention, there is provided a motor driving device including the reactor according to any of the first to twenty-fourth aspects of the present invention.

According to a twenty-sixth aspect of the present invention, there is provided a machine including the motor driving device according to the twenty-fifth aspect of the present invention.

According to a twenty-seventh aspect of the present invention, there is provided a power conditioner including the reactor according to any of the first to twenty-fourth aspects of the present invention.

According to a twenty-eighth aspect of the present invention, there is provided a machine or device including the power conditioner according to the twenty-seventh aspect of the present invention.

The objects, features, and advantages as well as other objects, features, and advantages of the present invention will become clear due to detailed descriptions of exemplary embodiments of the present invention illustrated in the accompanying drawings.

BRIEF DESCRIPTION OF THE DRAWINGS

FIG. 10 is a cross-sectional view of a three-phase reactor according to a tenth embodiment of the present invention;

FIG. 11 is a cross-sectional view of a three-phase reactor according to an example of the present invention;

FIG. 12 is a top face view of a three-phase reactor according to another example of the present invention;

DETAILED DESCRIPTION

Figures 1A, 1B:
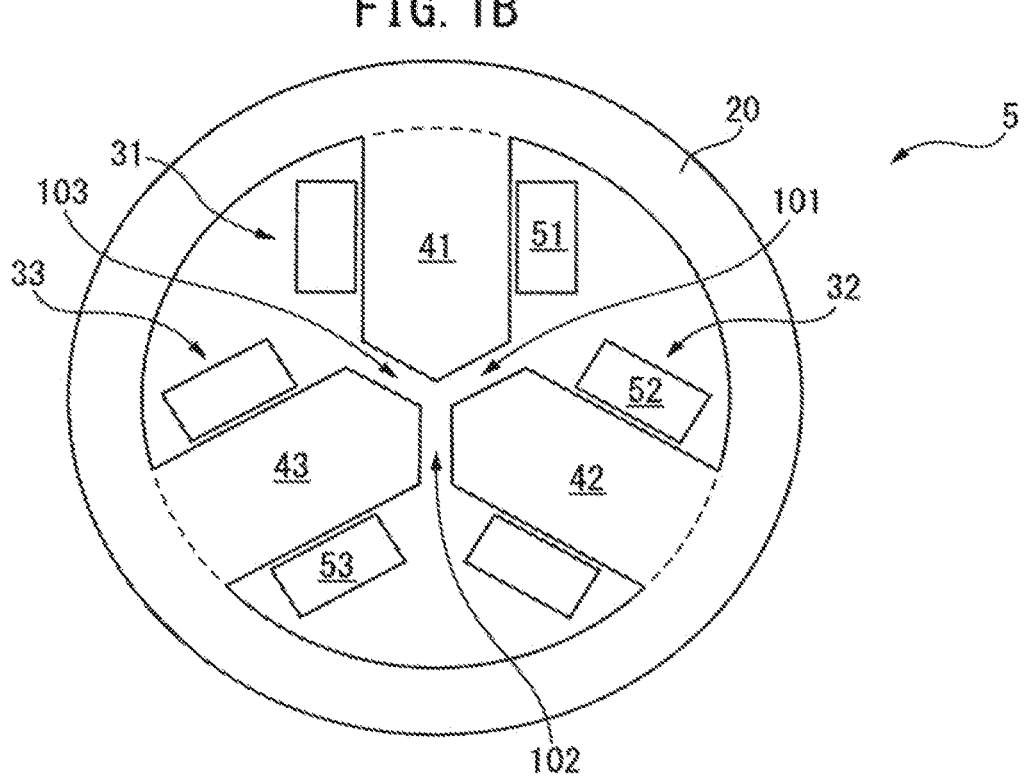
FIG. 1A is a top face view of a three-phase reactor according to a first embodiment of the present invention.
FIG. 1B is a cross-sectional view of the three-phase reactor illustrated in FIG. 1A.

Embodiments of the present invention will be described below with reference to the accompanying drawings. In the following drawings, similar members are denoted by similar reference characters. The reduction scales of the drawings are varied as appropriate in order to facilitate understanding.

FIG. 1A is a top face view of a three-phase reactor according to a first embodiment of the present invention. Further, FIG. 1B is a cross-sectional view of the three-phase reactor illustrated in FIG. 1A, and FIG. 1C is a perspective view of the three-phase reactor illustrated in FIG. 1A.

Figure 1C:
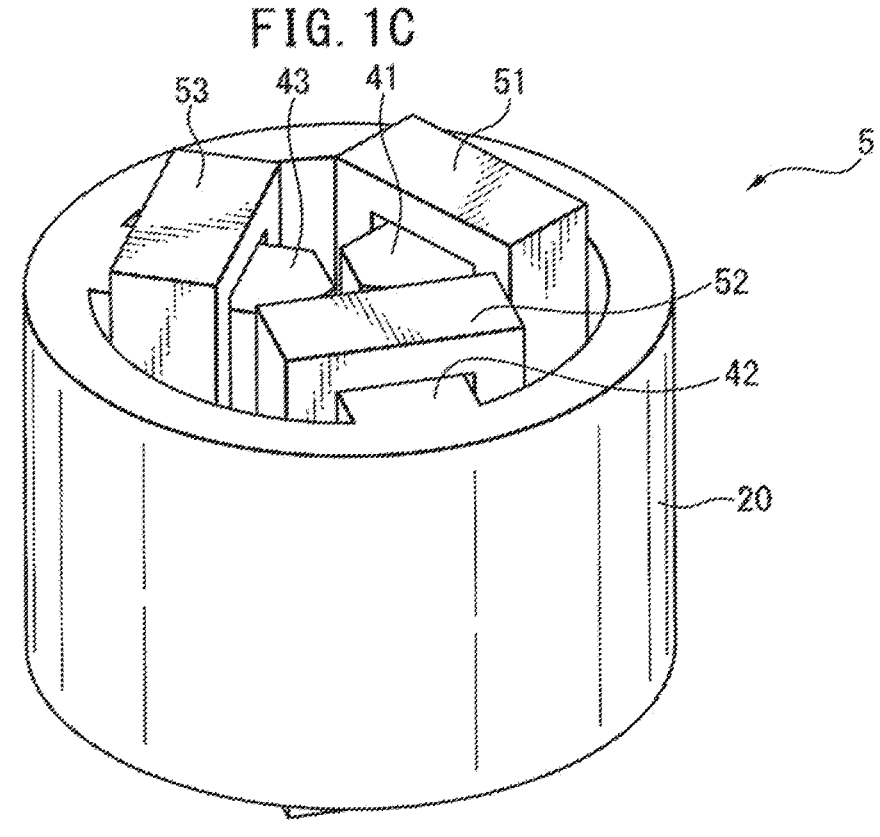
FIG. 1C is a perspective view of the three-phase reactor illustrated in FIG. 1A.

As illustrated in FIG. 1A, FIG. 1B, and FIG. 1C, a three-phase reactor 5 includes: an outer peripheral iron core 20; and three iron-core coils 31 to 33 of which each is magnetically connected to the outer peripheral iron core 20. In FIG. 1A, the iron-core coils 31 to 33 are arranged in the inside of the outer peripheral iron core 20 having a ring shape. The iron-core coils 31 to 33 are spaced from each other circumferentially at regular intervals in the three-phase reactor 5.

As can be seen from the drawings, the iron-core coils 31 to 33 include: corresponding iron cores 41 to 43 that radially extend; and corresponding coils 51 to 53 wound around the iron cores. The radially outer end of each of the iron cores 41 to 43 comes in contact with the outer peripheral iron core 20, or is formed integrally with the outer peripheral iron core 20.

Further, the radially inner end of each of the iron cores 41 to 43 is located in the vicinity of the center of the outer peripheral iron core 20. In FIG. 1A and the like, the radially inner end of each of the iron cores 41 to 43 converges toward the center of the outer peripheral iron core 20, and the front end angle of the radially inner end is about 120 degrees. The radially inner ends of the iron cores 41 to 43 are spaced from each other through gaps 101 to 103 that can magnetically connect the radially inner ends to each other.

In other words, in the first embodiment, the radially inner end of the iron core 41 is spaced from each of the radially inner ends of the two adjacent iron cores 42, 43 through each of the gaps 101, 102. The same also applies to the other iron cores 42, 43. The dimensions of the gaps 101 to 103 are intended to be equal to each other. In embodiments described later, illustrations of the gaps 101 to 103 may be omitted.

The three-phase reactor 5 can be formed to be lightweight and simple because a central iron core located in the center of the three-phase reactor 5 is unnecessary in the present invention as described above. Further, the three iron-core coils 31 to 33 are surrounded by the outer peripheral iron core 20, and therefore, a magnetic field generated from the coils 51 to 53 does not leak out to the outside of the outer peripheral iron core 20. Further, the gaps 101 to 103 having optional thicknesses can be inexpensively disposed, and therefore, the reactor is more advantageous in view of design than reactors having conventional structures.

Further, differences in magnetic path lengths between phases in the three-phase reactor 5 of the present invention become less than those in the reactors having the conventional structures. Therefore, in the present invention, an imbalance in inductances caused by the differences in the magnetic path lengths can be reduced.

Figure 2:
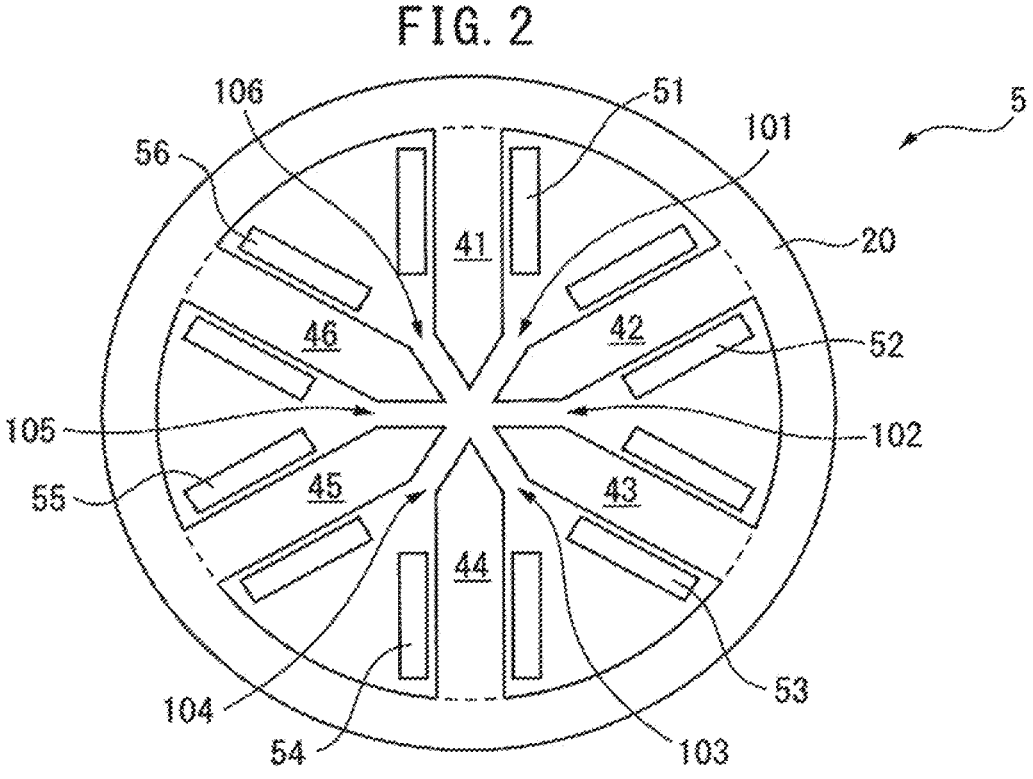
FIG. 2 is a cross-sectional view of a three-phase reactor according to a second embodiment of the present invention.

FIG. 2 is a cross-sectional view of a three-phase reactor according to a second embodiment of the present invention. A three-phase reactor 5 illustrated in FIG. 2 includes: an outer peripheral iron core 20; and iron-core coils 31 to 36, each of which is magnetically connected to the outer peripheral iron core 20, and which are similar to those described above. The iron-core coils 31 to 36 include: corresponding iron cores 41 to 46 that radially extend; and corresponding coils 51 to 56 wound around the iron cores.

The front end angle of the radially inner end of each of the iron cores 41 to 46 of the three-phase reactor 5 illustrated in FIG. 2 is about 60 degrees. The radially inner ends of the iron cores 41 to 46 are spaced from each other through gaps 101 to 106 that can magnetically connect the radially inner ends to each other. As described above, the three-phase reactor 5 may include the iron-core coils 31 to 36 of which the number is a multiple of 3.

It is obvious that effects that are generally similar to the effects described above can also be obtained in the second embodiment. Further, in the second embodiment, the number of the iron-core coils 31 to 36 is intended to be a multiple of 3, and therefore, plural iron-core coils exist for one phase. The cross-sectional area of each of the iron-core coils can be reduced by connecting the plural iron-core coils in parallel to each other.

Figures 3A, 3B:
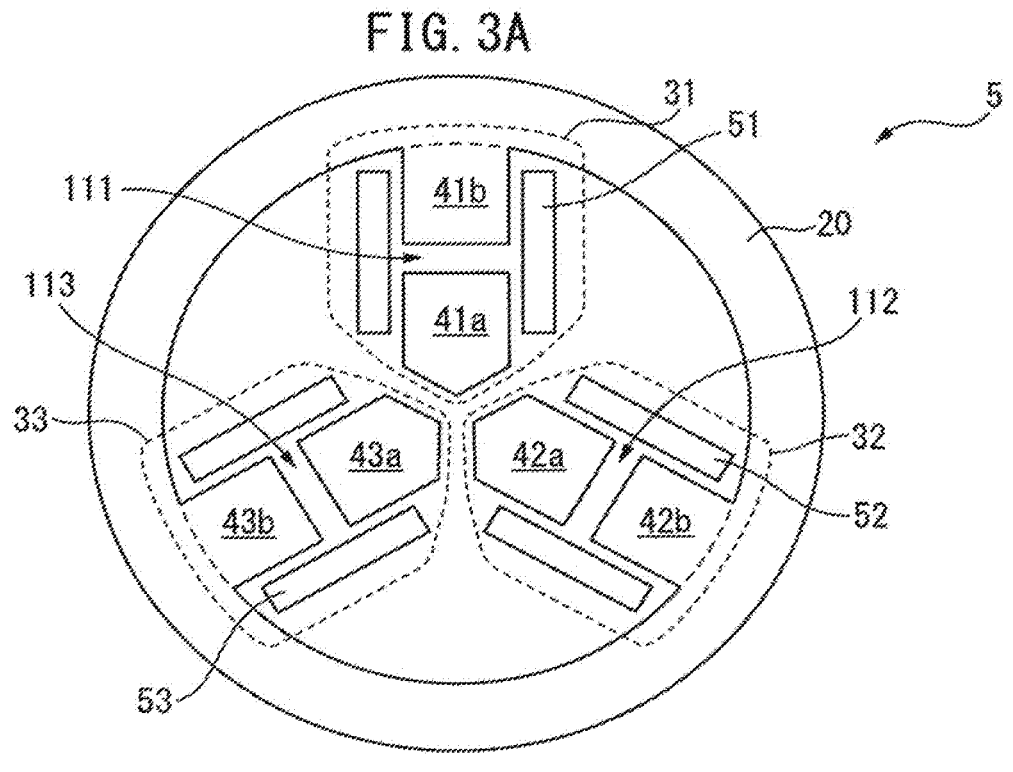
FIG. 3A is a cross-sectional view of a three-phase reactor according to a third embodiment of the present invention.
FIG. 3B is a cross-sectional view of another three-phase reactor according to the third embodiment of the present invention.

FIG. 3A is a cross-sectional view of a three-phase reactor according to a third embodiment of the present invention. Iron cores 41 to 43 that radially extend in iron-core coils 31 to 33 in a three-phase reactor 5 illustrated in FIG. 3A include first iron-core units 41a to 43a that are located in radially internal sides, and second iron-core units 41b to 43b that are located in radially external sides, respectively. Iron-core unit gaps 111 to 113 that can magnetically connect the first iron-core units 41a to 43a and the second iron-core units 41b to 43b are formed between the first iron-core units 41a to 43a and the second iron-core units 41b to 43b. Further, the three-phase reactor 5 includes coils 51 to 53 that are wound around both the first iron-core units 41a to 43a and the second iron-core units 41b to 43b, respectively.

Further, FIG. 3B is a cross-sectional view of another three-phase reactor according to the third embodiment of the present invention. Iron cores 41 to 43 that radially extend in iron-core coils 31 to 33 include first iron-core units 41a to 43a that are located in radially internal sides, and second iron-core units 41b to 43b that are located in radially external sides, respectively. Iron-core unit gaps 111 to 113 that can magnetically connect the first iron-core units 41a to 43a and the second iron-core units 41b to 43b are formed between the first iron-core units 41a to 43a and the second iron-core units 41b to 43b. Further, a three-phase reactor 5 includes first coils 51a to 53a that are wound around the first iron-core units 41a to 43a, and second coils 51b to 53b that are wound around the second iron-core units 41b to 43b.

In other words, in the embodiments illustrated in FIG. 3A and FIG. 3B, each of the iron cores 41 to 43 includes the two iron-core units arranged in a single row. Each of the iron-core coils 31 to 33 includes the iron-core unit gaps 111 to 113 formed between the iron-core units.

In the embodiments illustrated in FIG. 3A and FIG. 3B, iron-core unit gaps 111 to 113 as well as the gaps 101 to 103 are formed, and therefore, the dimensions of the gaps and iron-core unit gaps included in the iron-core coils 31 to 33 can be reduced. Further, magnetic fluxes leaking out of the gaps 101 to 103 and the iron-core unit gaps 111 to 113 can be reduced. It will be appreciated that each of the iron cores 41 to 43 may include three or more iron-core units arranged in a single row.

Figure 4:
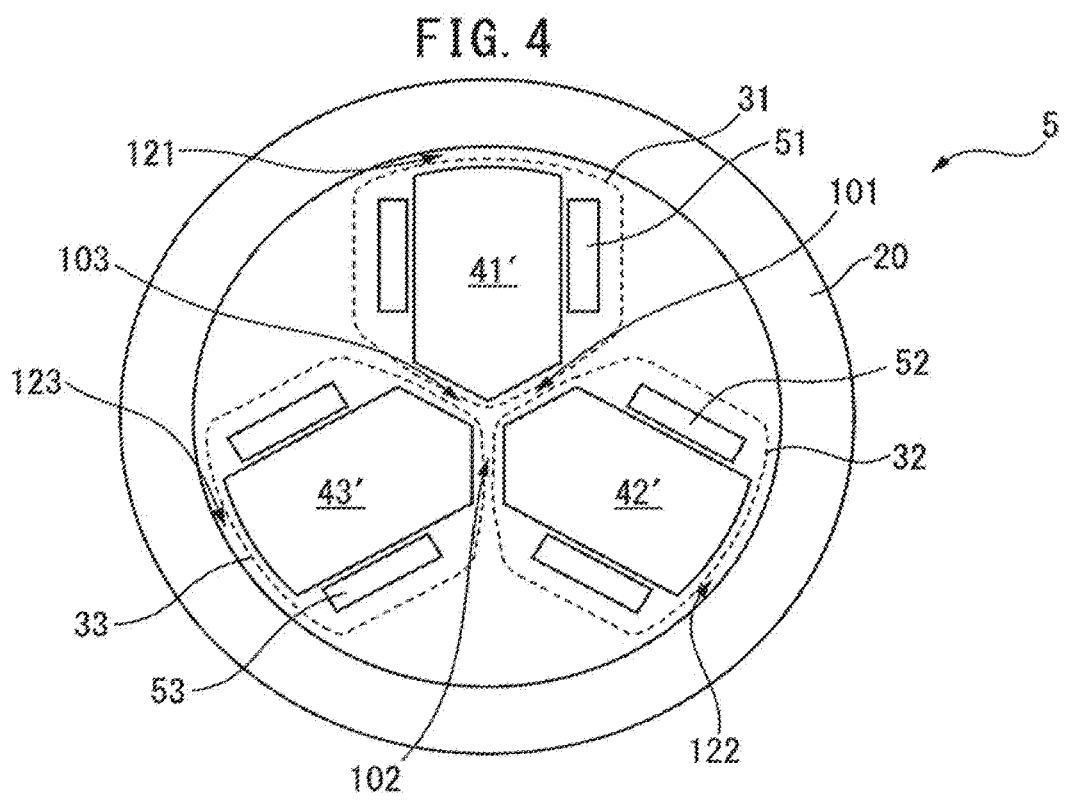
FIG. 4 is a cross-sectional view of a three-phase reactor according to a fourth embodiment of the present invention.

FIG. 4 is a cross-sectional view of a three-phase reactor according to a fourth embodiment of the present invention. Iron-core coils 31 to 33 in a three-phase reactor 5 illustrated in FIG. 4 includes: iron cores 41' to 43' that radially extend; and coils 51 to 53 wound around the iron cores. Like the embodiments described above, the radially inner ends of the iron cores 41' to 43' are adjacent to each other through gaps 101 to 103.

In the fourth embodiment, corresponding outer peripheral iron-core gaps 121 to 123 that can magnetically connect the radially outer ends of the iron cores 41' to 43' and an outer peripheral iron core 20 to each other are formed between the radially outer ends of the iron cores 41' to 43' and an outer peripheral iron core 20. Heat is generated in the iron-core coils 31 to 33 when the three-phase reactor 5 is operated. The fourth embodiment has the effect of inhibiting heat generated from the iron-core coils 31 to 33 from being transferred to the outer peripheral iron core 20 because the outer peripheral iron-core gaps 121 to 123 are formed.

Figure 5:
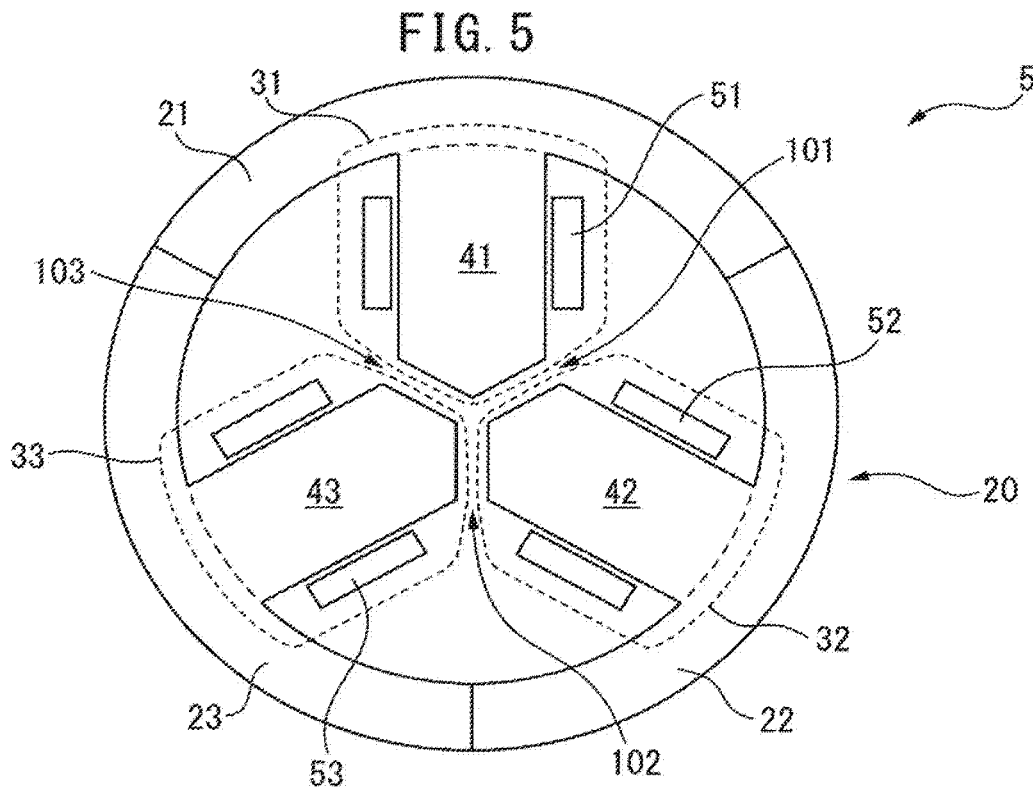
FIG. 5 is a cross-sectional view of a three-phase reactor according to a fifth embodiment of the present invention.

FIG. 5 is a cross-sectional view of a three-phase reactor according to a fifth embodiment of the present invention. Iron-core coils 31 to 33 in a three-phase reactor 5 illustrated in FIG. 5 are generally similar to those described with reference to FIG. 1. In the fifth embodiment, an outer peripheral iron core 20 includes plural, for example, three outer peripheral iron-core units 21 to 23 having an arc shape. In FIG. 5, the outer peripheral iron-core unit 21 comes in contact with an iron core 41, or is formed integrally with the iron core 41. Similarly, the outer peripheral iron-core units 22, 23 come in contact with iron cores 42, 43, or are formed integrally with the iron cores 42, 43, respectively. In the embodiment illustrated in FIG. 5, the outer peripheral iron core 20 can be easily manufactured even when the outer peripheral iron core 20 is large.

Figure 6:
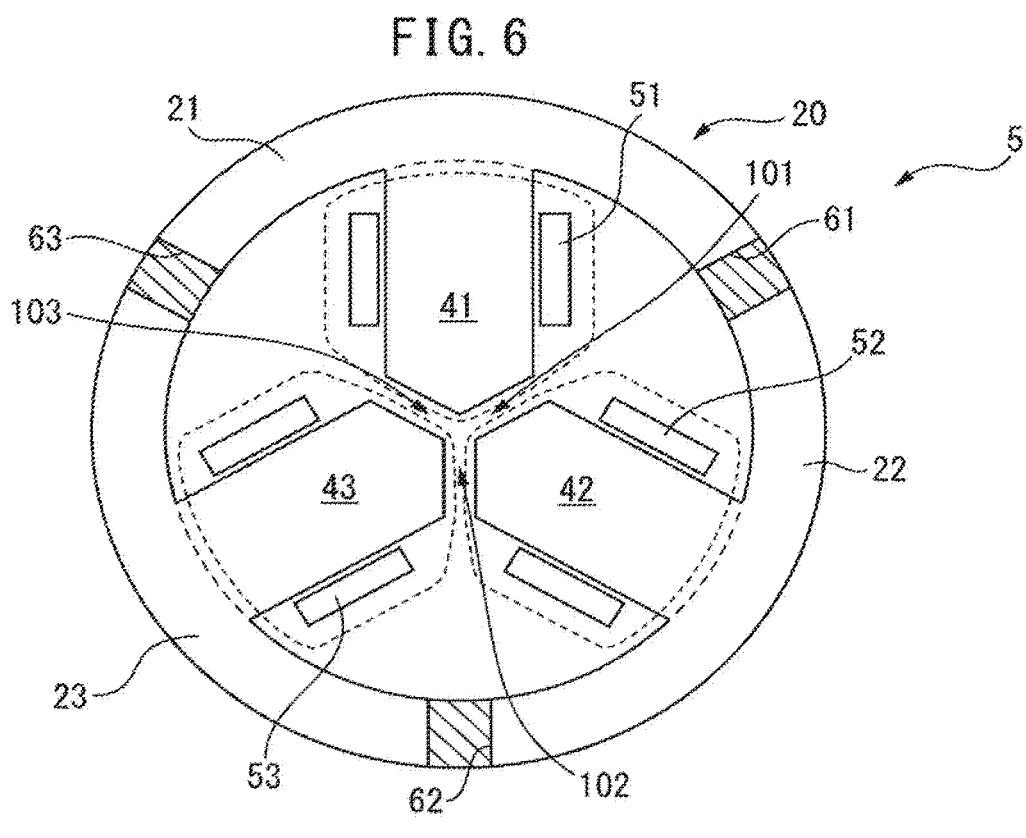
FIG. 6 is a cross-sectional view of a three-phase reactor according to a sixth embodiment of the present invention.

FIG. 6 is a cross-sectional view of a three-phase reactor according to a sixth embodiment of the present invention. In the sixth embodiment, an outer peripheral iron-core unit gap 61 that can magnetically connect an outer peripheral iron-core unit 21 and an outer peripheral iron-core unit 22 is formed between the outer peripheral iron-core unit 21 and the outer peripheral iron-core unit 22. Similarly, outer peripheral iron-core unit gaps 62, 63 that can magnetically connect an outer peripheral iron-core unit 22 and an outer peripheral iron-core unit 23, and an outer peripheral iron-core unit 23 and an outer peripheral iron-core unit 21, respectively, are formed between the outer peripheral iron-core unit 22 and the outer peripheral iron-core unit 23, and between the outer peripheral iron-core unit 23 and the outer peripheral iron-core unit 21, respectively.

In other words, each of the outer peripheral iron-core units 21 to 23 is arranged through each of the outer peripheral iron-core unit gaps 61 to 63. In such a case, the outer peripheral iron-core unit gaps 61 to 63 can be adjusted by adjusting the lengths of the outer peripheral iron-core units 21 to 23. It is obvious that as a result, an imbalance in inductances in three-phase reactor 5 can be adjusted.

A three-phase reactor 5 illustrated in FIG. 6 differs from the three-phase reactor 5 illustrated in FIG. 5 only in view of having the outer peripheral iron-core unit gaps 61 to 63. In other words, the outer peripheral iron-core unit gaps 61 to 63 are not formed between the adjacent outer peripheral iron-core units 21 to 23 in the fifth embodiment. In the embodiments illustrated in FIG. 5 and FIG. 6, the outer peripheral iron core 20 can be easily manufactured even when the outer peripheral iron core 20 is large.

Figure 7:
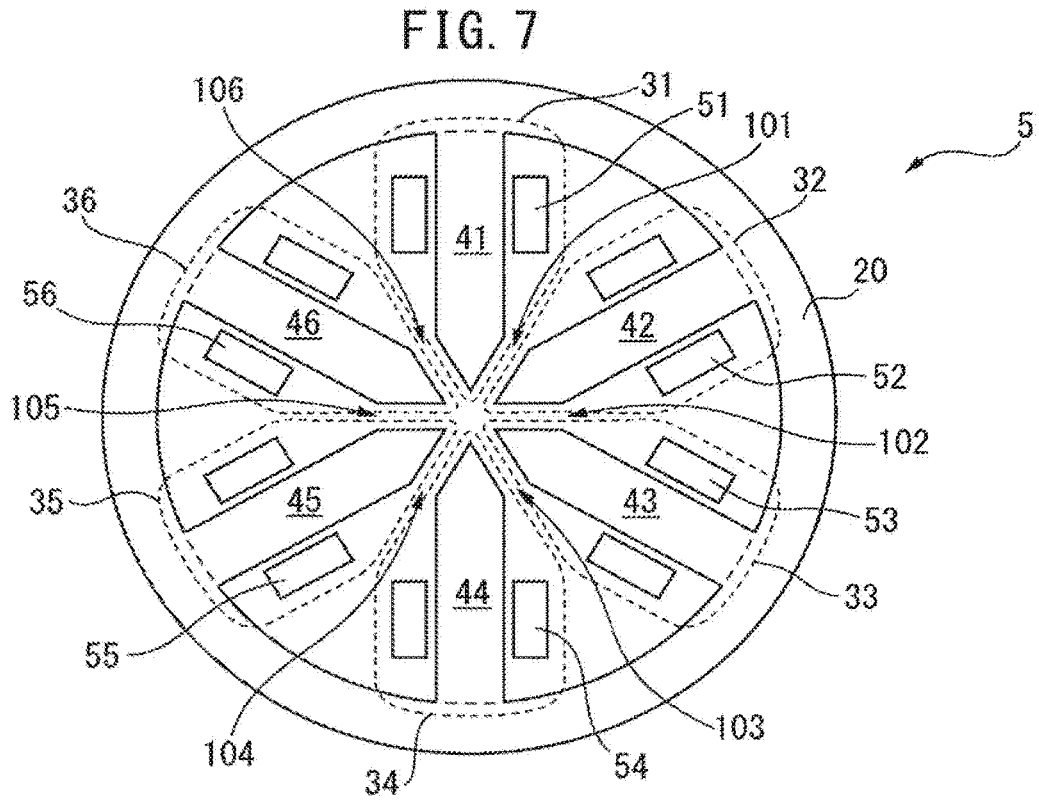
FIG. 7 is a cross-sectional view of a three-phase reactor according to a seventh embodiment of the present invention.

FIG. 7 is a cross-sectional view of a three-phase reactor according to a seventh embodiment of the present invention. Because a three-phase reactor 5 illustrated in FIG. 7 is generally similar to the three-phase reactor 5 illustrated in FIG. 2, detailed descriptions of the three-phase reactor 5 are omitted. In FIG. 7, the dimensions of corresponding iron cores 41 to 46 and coils 51 to 56 in iron-core coils 31 to 36 as well as gaps 101 to 106 are equal to each other.

Further, the iron-core coils 31 to 36 are arranged rotationally symmetrically in the three-phase reactor 5. Therefore, it is obvious that an imbalance in inductances caused by the arrangement of the six iron-core coils 31 to 36 can be minimized in the three-phase reactor 5 illustrated in FIG. 7. The same also applies to the embodiment illustrated in FIG. 1, including the three iron-core coils 31 to 33.

Figure 8:
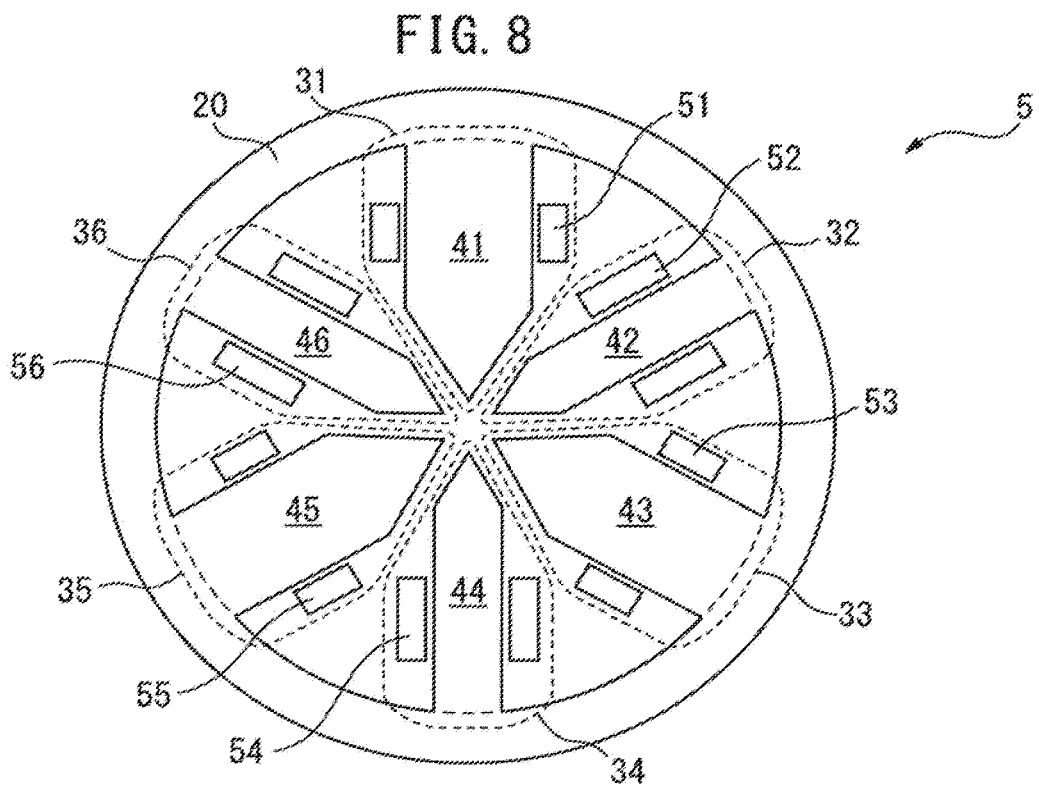
FIG. 8 is a cross-sectional view of a three-phase reactor according to an eighth embodiment of the present invention.

Further, FIG. 8 is a cross-sectional view of a three-phase reactor according to an eighth embodiment of the present invention. A three-phase reactor 5 illustrated in FIG. 8 is generally similar to the three-phase reactor 5 illustrated in FIG. 7. However, iron cores 41, 43, and 45 in the three-phase reactor 5 illustrated in FIG. 8 are wider than other iron cores 42, 44, and 46. Further, the cross-sectional areas of coils 51, 53, and 55 wound around the iron cores 41, 43, and 45 are smaller than those of coils 52, 54, and 56 wound around the other iron cores 42, 44, and 46.

In other words, the three-phase reactor 5 illustrated in FIG. 8 includes a first set including three iron-core coils 31, 33, and 35, and a second set including three other iron-core coils 32, 34, and 36. Each of the first set and the second set alternately includes three iron-core coils of the six iron-core coils 31 to 36. The iron-core coils are rotationally symmetrically arranged in each of the first set and the second set.

In the three-phase reactor 5 illustrated in FIG. 8, the dimensions of the iron cores, and the cross-sectional areas and winding numbers of the coils are intended to differ between the first set and the second set. The dimensions of the gaps in the first set of the three-phase reactor 5 may be intended to differ from the dimensions of the gaps in the second set.

In the embodiment illustrated in FIG. 8, two reactors having different properties can be substantially included in one three-phase reactor 5. In the embodiment illustrated in FIG. 7, two reactors having the same property can be included in one three-phase reactor 5. In the embodiments illustrated in FIG. 7 and FIG. 8, an installation space can be reduced because the two reactors having the same or different properties can be included in one reactor. It is obvious that inductance values can be adjusted by connecting two reactors in series or parallel to each other. Three or more reactors having different properties or the same properties, i.e., the three or more sets described above may be included in one three-phase reactor 5. It is obvious that similar effects can also be obtained in such a case.

Figure 9:
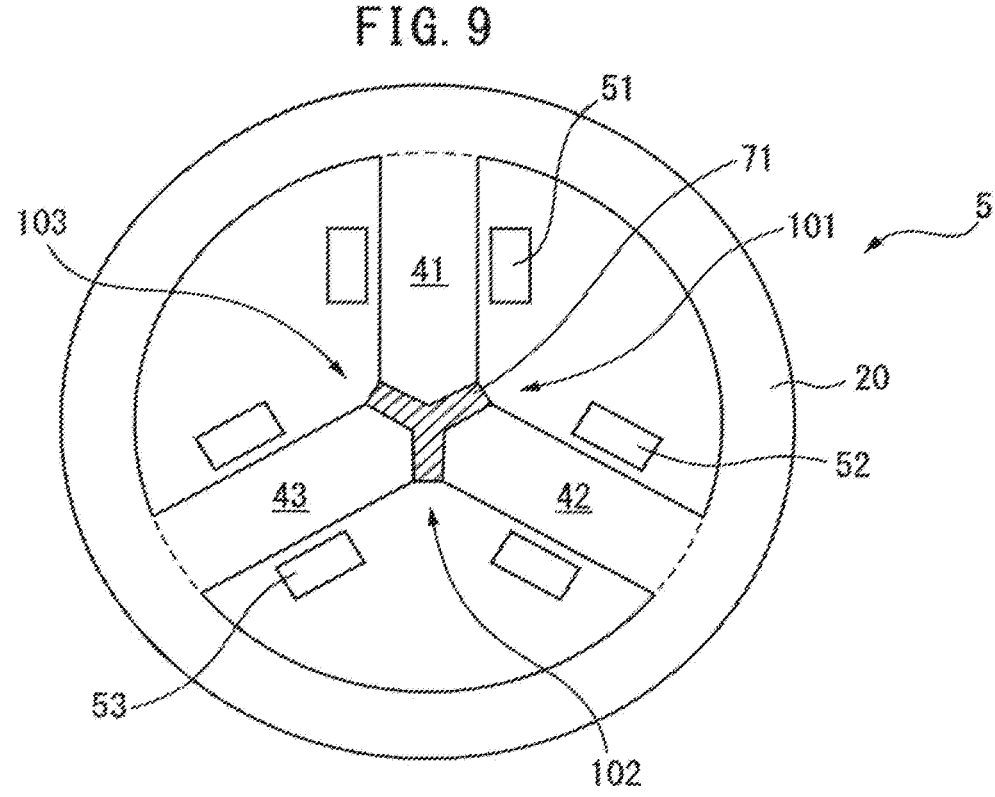
FIG. 9 is a cross-sectional view of a three-phase reactor according to a ninth embodiment of the present invention.

FIG. 9 is a cross-sectional view of a three-phase reactor according to a ninth embodiment of the present invention. A three-phase reactor 5 illustrated in FIG. 9 is generally similar to the three-phase reactor 5 described with reference to FIG. 1A, and therefore, descriptions of the three-phase reactor 5 are omitted. As illustrated in FIG. 9, a gap member 71 made of resin is filled into gaps 101 to 103 in the three-phase reactor 5.

In such a case, the gap member 71 can be produced by simply filling the resin into the gaps 101 to 103, and curing the resin. Therefore, the gap member 71 can be easily produced. A generally Y-shaped gap member 71 that is similar to the gap member 71 illustrated in FIG. 9 may be produced in advance, and may be inserted into the gaps 101 to 103 instead of filling the resin. In such a case, the gap member 71 suppresses vibrations of iron cores coming in contact with the gaps 101 to 103, and therefore, noise generated from the iron cores can be reduced.

Figure 10:
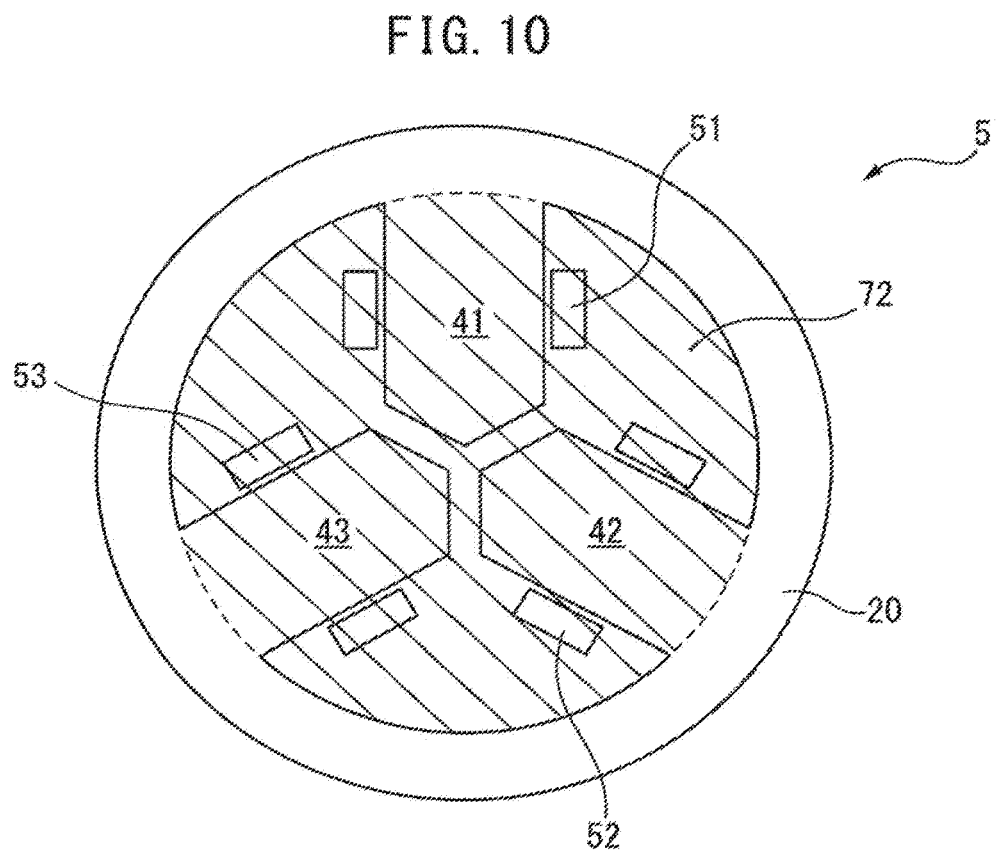

Further, FIG. 10 is a cross-sectional view of a three-phase reactor according to a tenth embodiment of the present invention. A three-phase reactor 5 illustrated in FIG. 10 is generally similar to the three-phase reactor 5 described with reference to FIG. 1A, and therefore, descriptions of the three-phase reactor 5 are omitted. As illustrated in FIG. 10, an insulating material 72 made of resin is filled into the inside of an outer peripheral iron core 20 in the three-phase reactor 5.

In such a case, the insulating material 72 can also be easily produced by simply filling the resin into the inside of the outer peripheral iron core 20, and curing the resin. In such a case, the insulating material 72 suppresses vibrations of iron-core coils 31 to 33 and the outer peripheral iron core 20, whereby generated noise can be reduced. Further, temperature equilibrium between the iron-core coils 31 to 33 and the outer peripheral iron core 20 can be promoted in the embodiment illustrated in FIG. 10.

Figure 11:
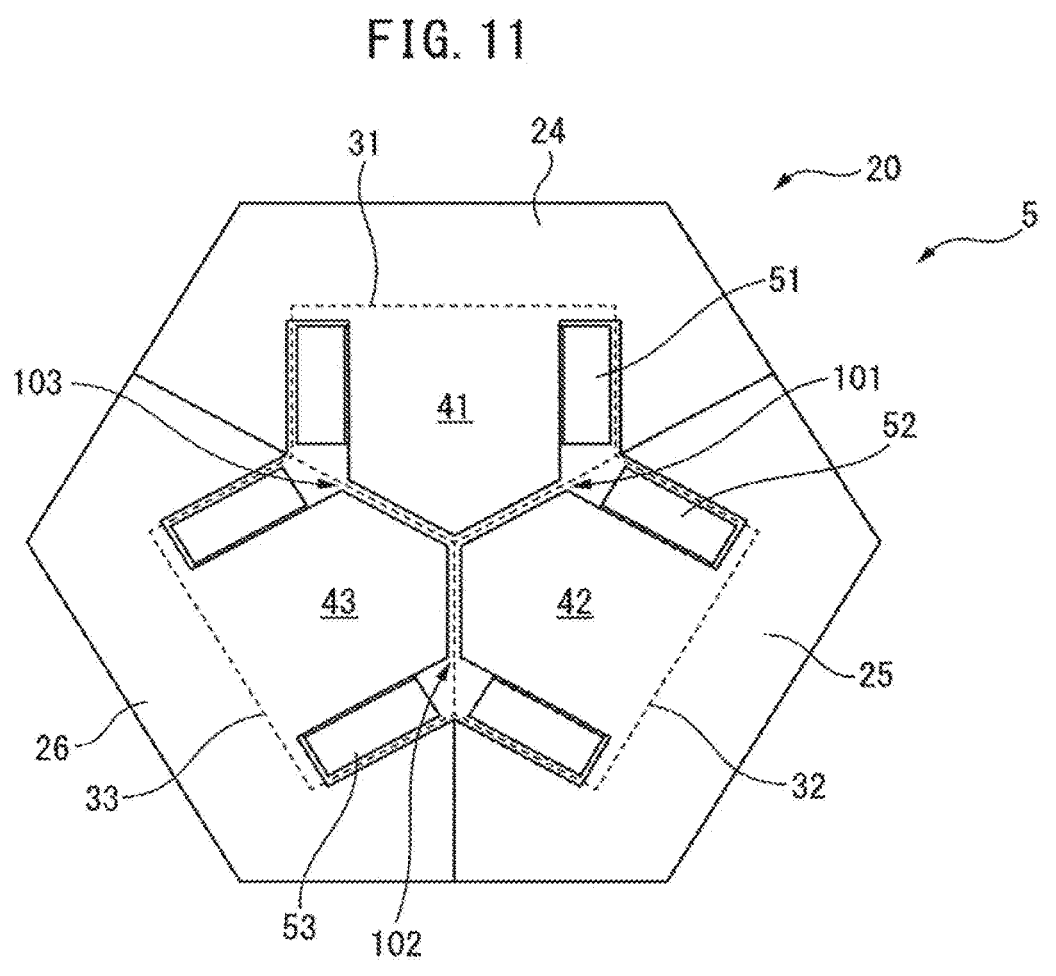
Figure 12:
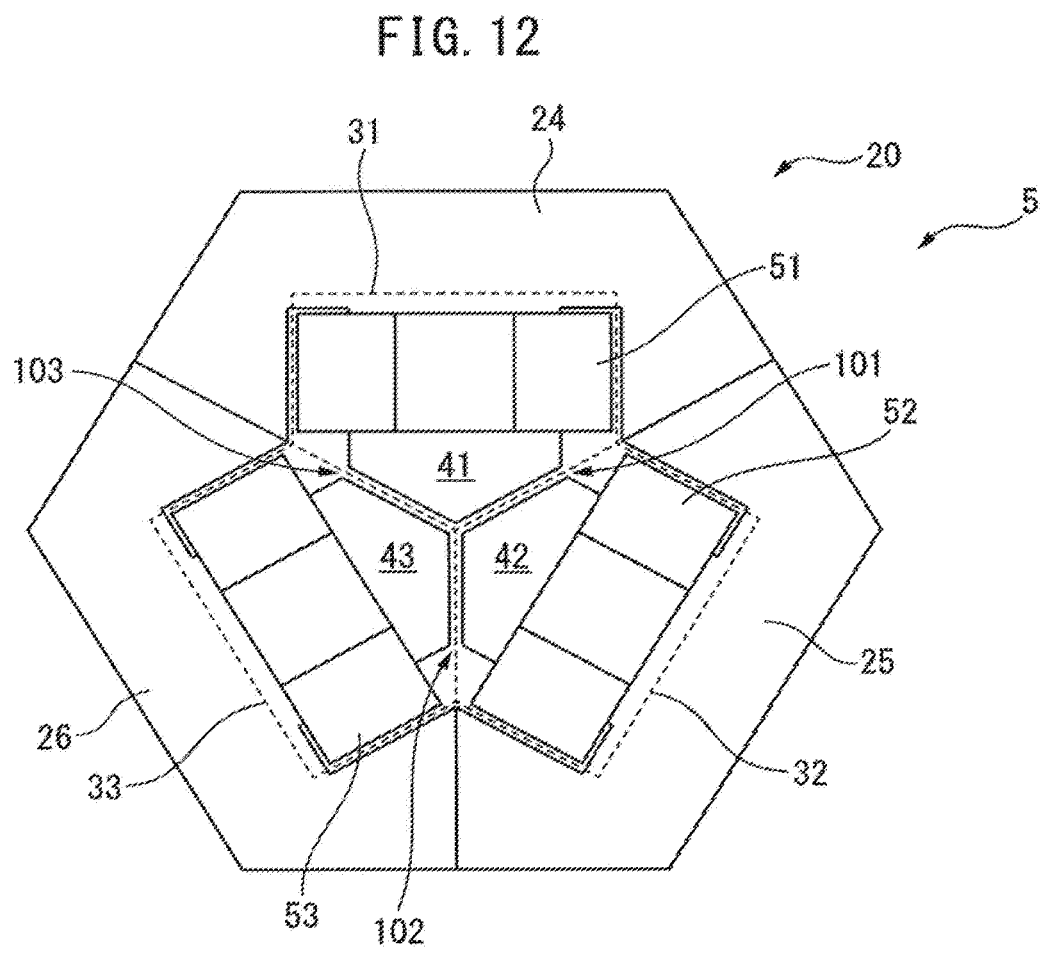

FIG. 11 is a cross-sectional view of a three-phase reactor according to an example of the present invention. Further, FIG. 12 is a top face view of a three-phase reactor according to an example of the present invention. A three-phase reactor 5 illustrated in FIG. 11 and FIG. 12 includes an outer peripheral iron core 20 which is generally hexagonal. The outer peripheral iron core 20 includes three outer peripheral iron-core units 24 to 26. The outer peripheral iron-core units 24 to 26 come in contact with iron cores 41 to 43, or are formed integrally with the iron cores 41 to 43, respectively. As illustrated in the drawings, the outer peripheral iron-core units 24 to 26 is formed only of straight units.

As illustrated in FIG. 11 and FIG. 12, the outer peripheral iron core 20 does not necessarily have a ring shape as long as the outer peripheral iron core 20 has a shape surrounding iron-core coils 31 to 33. Further, the outer peripheral iron core 20 having a shape other than the hexagonal shape is within the scope of the present invention. It will be obvious to those skilled in the art that some of the embodiments described above are combined as appropriate.

Figure 13A:
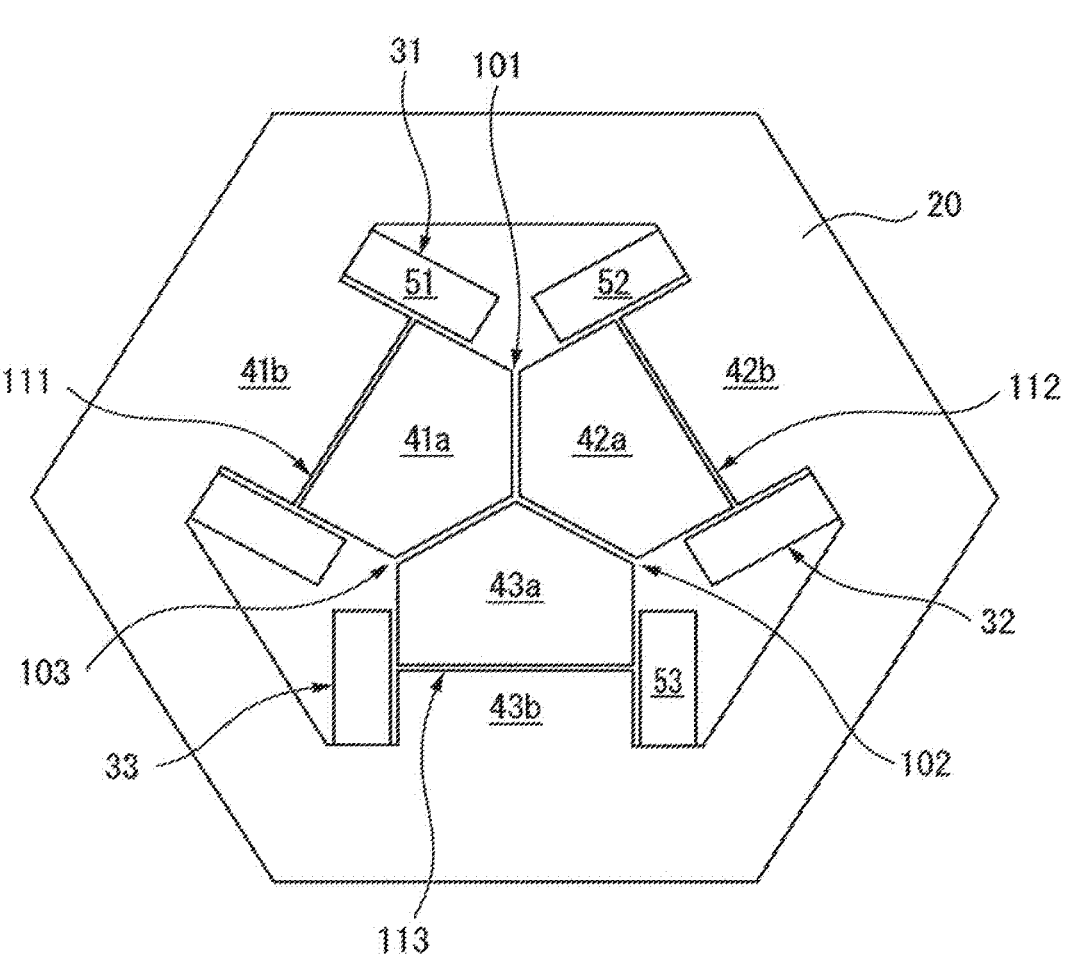
FIG. 13A is a top face view of a conventional three-phase reactor.

Further, FIG. 13A is a top face view of a three-phase reactor similar to that of FIG. 3A. In FIG. 13A, three iron-core coils 31 to 33 in the three-phase reactor are formed of iron cores 41 to 43 and coils 51 to 53, respectively, and gaps 101 to 103 that can magnetically connect the adjacent iron-core coils 31 to 33 are formed between the adjacent iron-core coils 31 to 33. Further, the iron cores 41 to 43 include plural iron-core units 41a, 41b, plural iron-core units 42a, 42b, and plural iron-core units 43a, 43b, respectively. Iron-core unit gaps 131 to 133 that can magnetically connect the iron-core units are formed between the iron-core units.

Figure 13B:
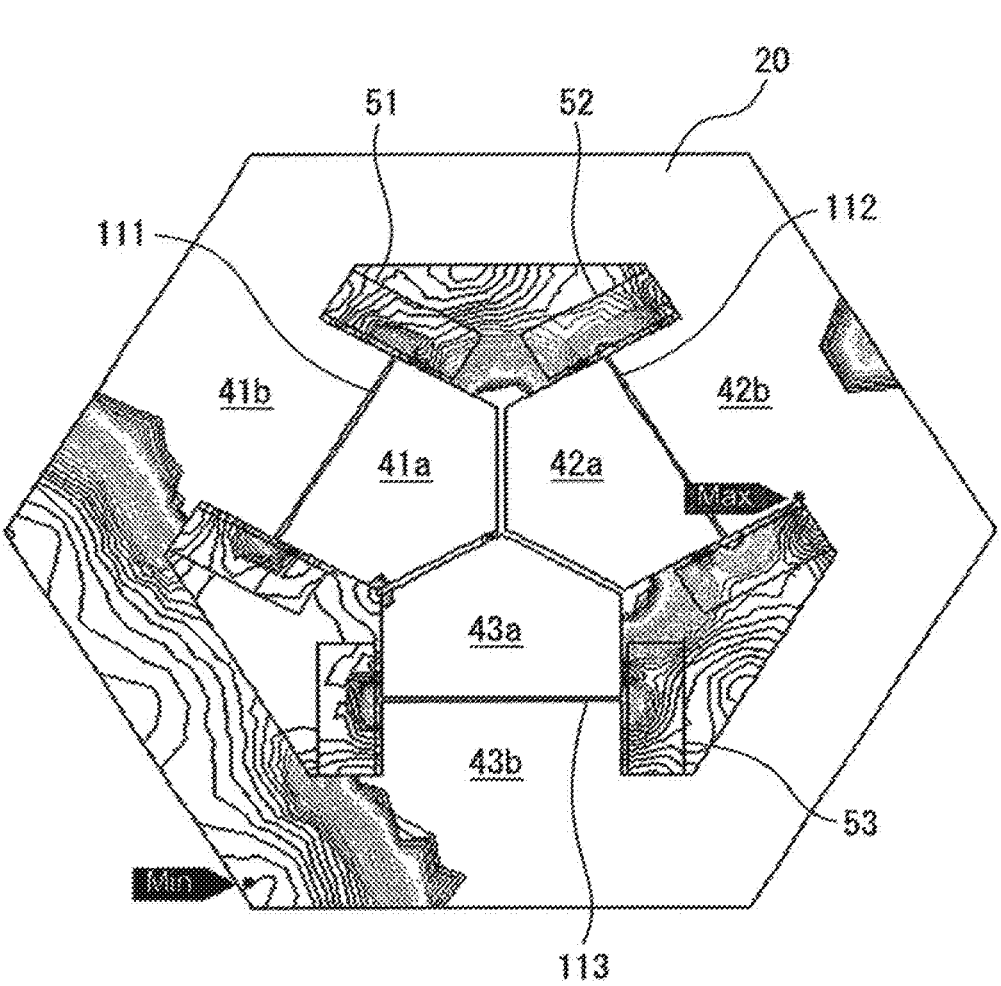
FIG. 13B is a view illustrating magnetic fluxes in the three-phase reactor illustrated in FIG. 13A.

Further, FIG. 13B is a view illustrating magnetic fluxes in the three-phase reactor illustrated in FIG. 13A. As illustrated in FIG. 13B, there is a problem that leakage fluxes from the vicinities of the iron-core unit gaps 131 to 133 penetrate the coils 51 to 53 in the vicinities thereof, thereby causing eddy-current losses to occur in the coils.

Figure 13C:
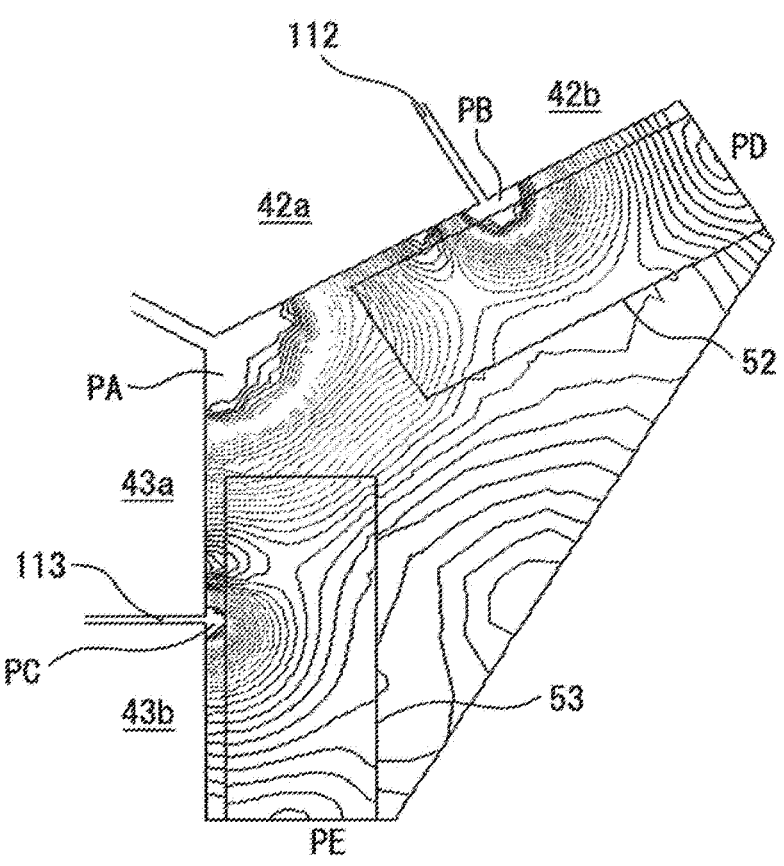
FIG. 13C is a partially enlarged view of FIG. 13B.

Further, FIG. 13C is a partially enlarged view of FIG. 13B. As illustrated in FIG. 13C, a magnetic flux density B in sites PD, PE in the radially outer vicinities of the coils 52, 53 is as relatively low as 0.001 T. In contrast, a magnetic flux density B in a site PA in the gap between the adjacent iron-core units 42a, 43a is 0.08 T or more. Magnetic flux densities B in sites PB, PC in iron-core unit gaps 1320, 1330 are also as relatively high as 0.08 T or more. In such sites, eddy-current losses occur in coils as described above.

Figure 14A:
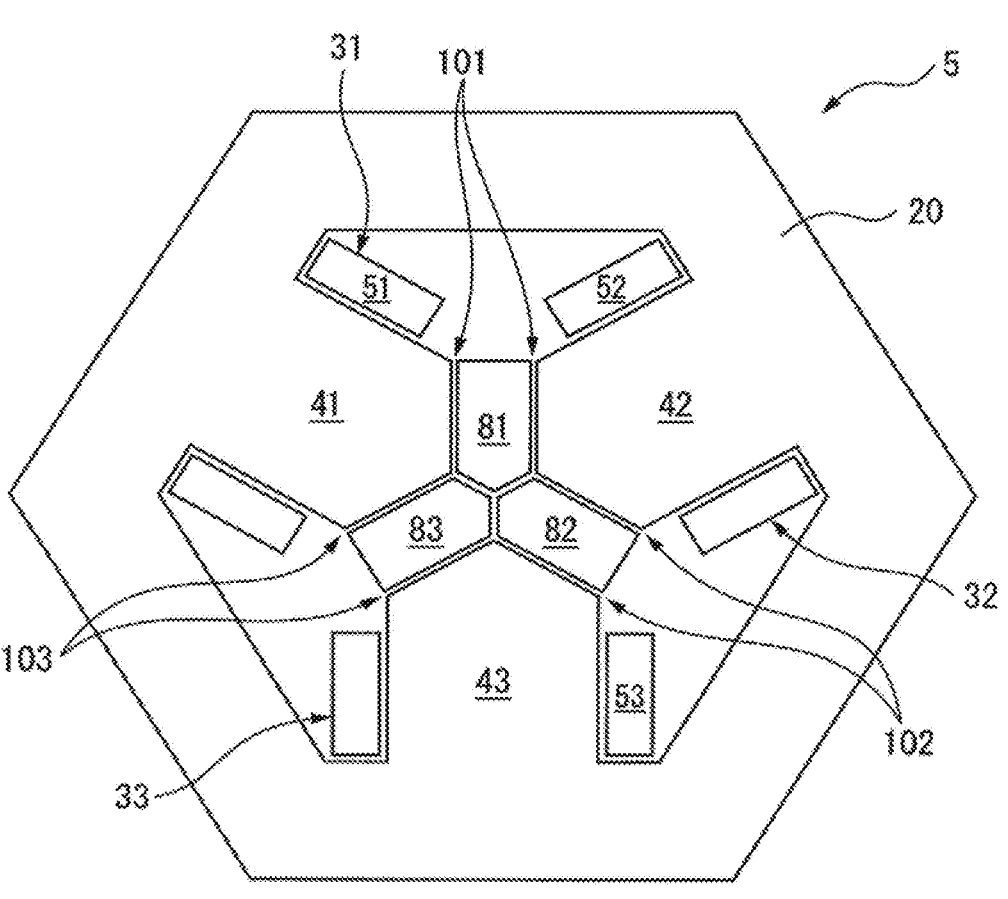
FIG. 14A is a cross-sectional view of a three-phase reactor according to an eleventh embodiment of the present invention.

FIG. 14A is a cross-sectional view of a three-phase reactor according to an eleventh embodiment of the present invention. Further, FIG. 14B is a perspective view of the three-phase reactor illustrated in FIG. 14A.

Figure 14B:
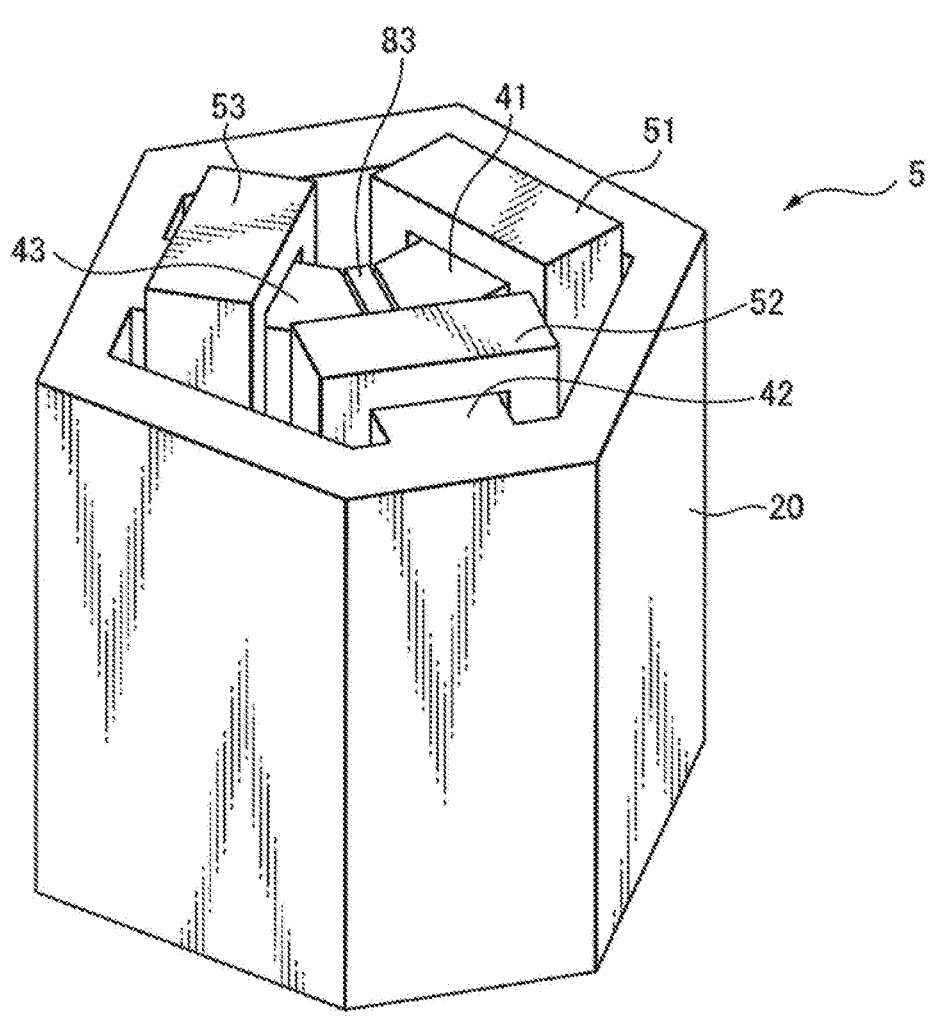
FIG. 14B is a perspective view of the three-phase reactor illustrated in FIG. 14A.

As illustrated in FIG. 14A and FIG. 14B, a three-phase reactor 5 include: an outer peripheral iron core 20; and three iron-core coils 31 to 33 that come in contact with the outer peripheral iron core 20 or are joined to the inner surface of the outer peripheral iron core 20. In FIG. 14A, the iron-core coils 31 to 33 are arranged in the inside of the outer peripheral iron core 20 having a hexagonal shape. The iron-core coils 31 to 33 are spaced from each other circumferentially at regular intervals in the three-phase reactor 5. The three-phase reactor 5 is rotationally symmetric. The outer peripheral iron core 20 may have another polygonal or ring shape.

As can be seen from the drawings, the iron-core coils 31 to 33 include: corresponding iron cores 41 to 43 that radially extend; and corresponding coils 51 to 53 wound around the iron cores. The radially outer end of each of the iron cores 41 to 43 comes in contact with the outer peripheral iron core 20, or may be formed integrally with the outer peripheral iron core 20.

Further, the radially inner end of each of the iron cores 41 to 43 is located in the vicinity of the center of the outer peripheral iron core 20. In FIG. 14A and the like, the radially inner end of each of the iron cores 41 to 43 converges toward the center of the outer peripheral iron core 20, and the front end angle of the radially inner end is about 120 degrees.

In FIG. 14A, three inter-coil iron cores 81 to 83 are arranged between the iron-core coils 31 to 33. Specifically, the inter-coil iron cores 81 to 83 are arranged in the vicinities of the radially inner ends of the iron cores 41 to 43 of the iron-core coils 31 to 33. In FIG. 1A, the inter-coil iron cores 81 to 83 are the same shapes as each other. The cross sections of the inter-coil iron cores 81 to 83 are pentagons of which two sides are parallel to each other.

Further, a gap 101 that can magnetically connect the inter-coil iron core 81 and the iron cores 41, 42 to each other is formed between the inter-coil iron core 81 and the iron cores 41, 42. Similarly, a gap 102 that can magnetically connect the inter-coil iron core 82 and the iron cores 42, 43 is formed between the inter-coil iron core 82 and the iron cores 42, 43. A gap 103 that can magnetically connect the inter-coil iron core 83 and the iron cores 43, 41 is formed between the inter-coil iron core 83 and the iron cores 43, 41. The dimensions of the gaps 101 to 103 are intended to be equal to each other. In embodiments described later, illustrations of the gaps 101 to 103 may be omitted.

Figure 14C:
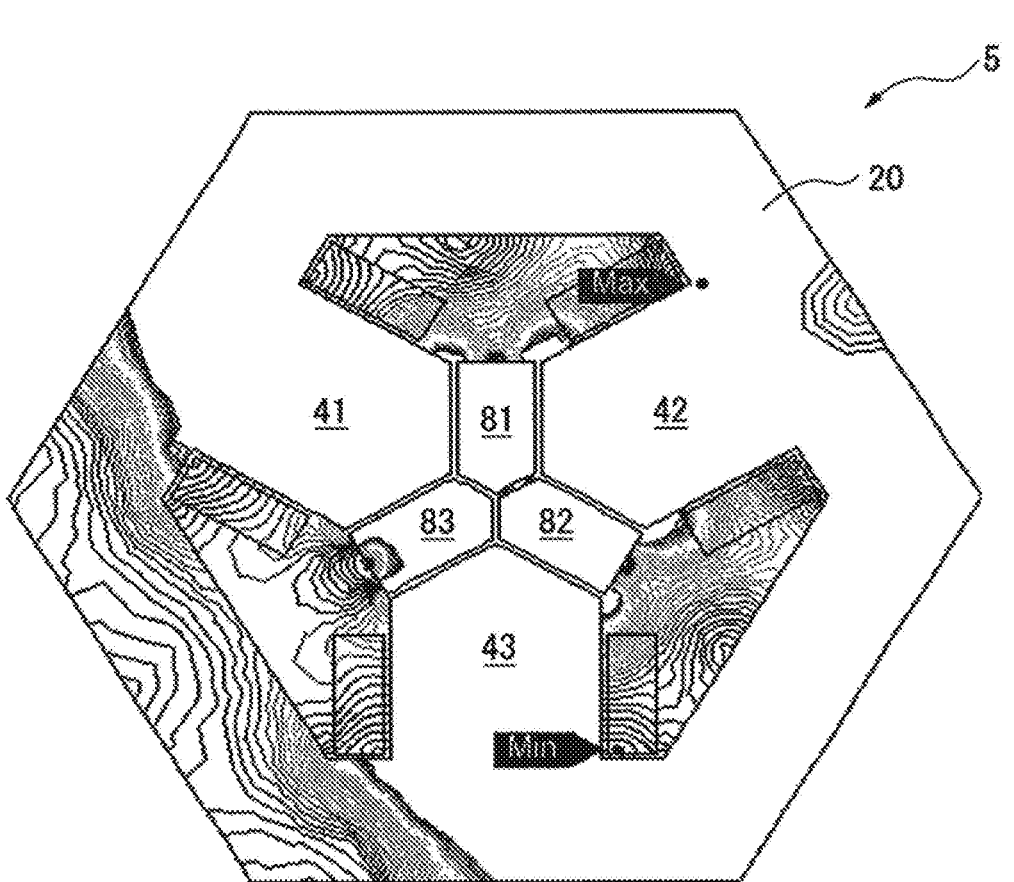
FIG. 14C is a view illustrating magnetic fluxes in the three-phase reactor illustrated in FIG. 14A.

FIG. 14C is a view illustrating magnetic fluxes in the three-phase reactor illustrated in FIG. 14A. In the present invention, as can be seen from comparisons between FIG. 14C and FIG. 13B, leakage fluxes from the vicinities of the gaps 101 to 103 are relatively weak, and therefore, do not penetrate the coils 51 to 53 in the vicinities thereof very much. Therefore, eddy-current losses are inhibited from occurring in the coils.

Figure 14D:
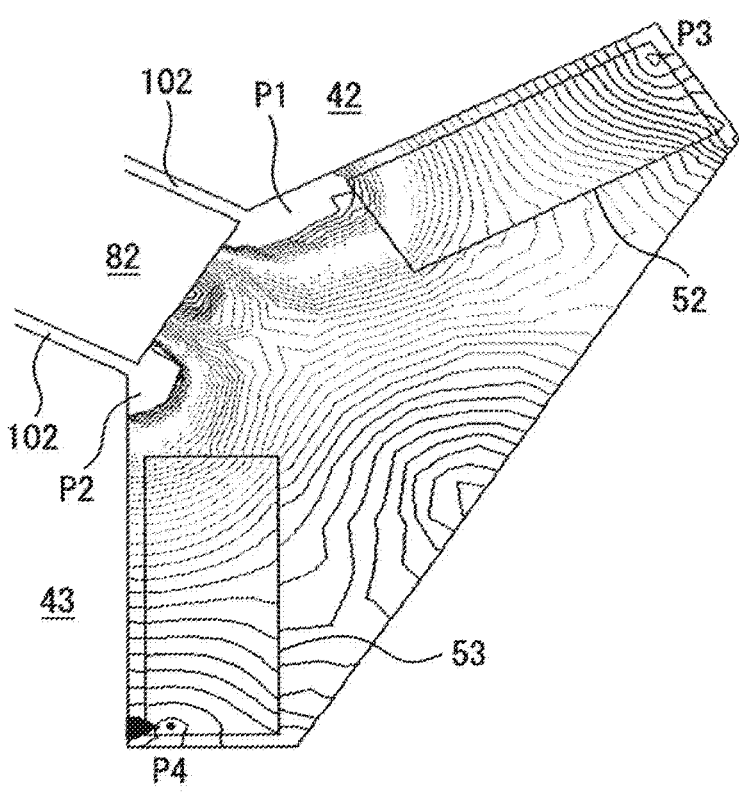
FIG. 14D is a partially enlarged view of FIG. 14C.

Further, FIG. 14D is a partially enlarged view of FIG. 14C. Magnetic flux densities B in sites P1, P2 in the gap 102 in both sides of the inter-coil iron core 82 are as relatively high as 0.08 T or more. In contrast, magnetic flux densities B in sites P3, P4 in the radially outer vicinities of the coils 52, 53 are as relatively low as 0.001 T.

However, sites having a magnetic flux density B of 0.08 T or more in FIG. 14D are only the sites P1, P2 in the gap 102 in both sides of the inter-coil iron core 82. Accordingly, comparisons between FIG. 14D and FIG. 13C may reveal that the number of sites in which leakage fluxes are generated from the vicinity of the gap 102 is small, and therefore, the leakage fluxes do not penetrate the coil 52 in the vicinity thereof very much. In other words, the gap 102 is formed between the iron cores 42, 43 and the inter-coil iron core 82, and therefore, magnetic fluxes that have leaked out are weak, whereby eddy-current losses occurring in the coils 52, 53 can be suppressed. The other gaps 101 and 103 also have similar effects.

Figure 15A:
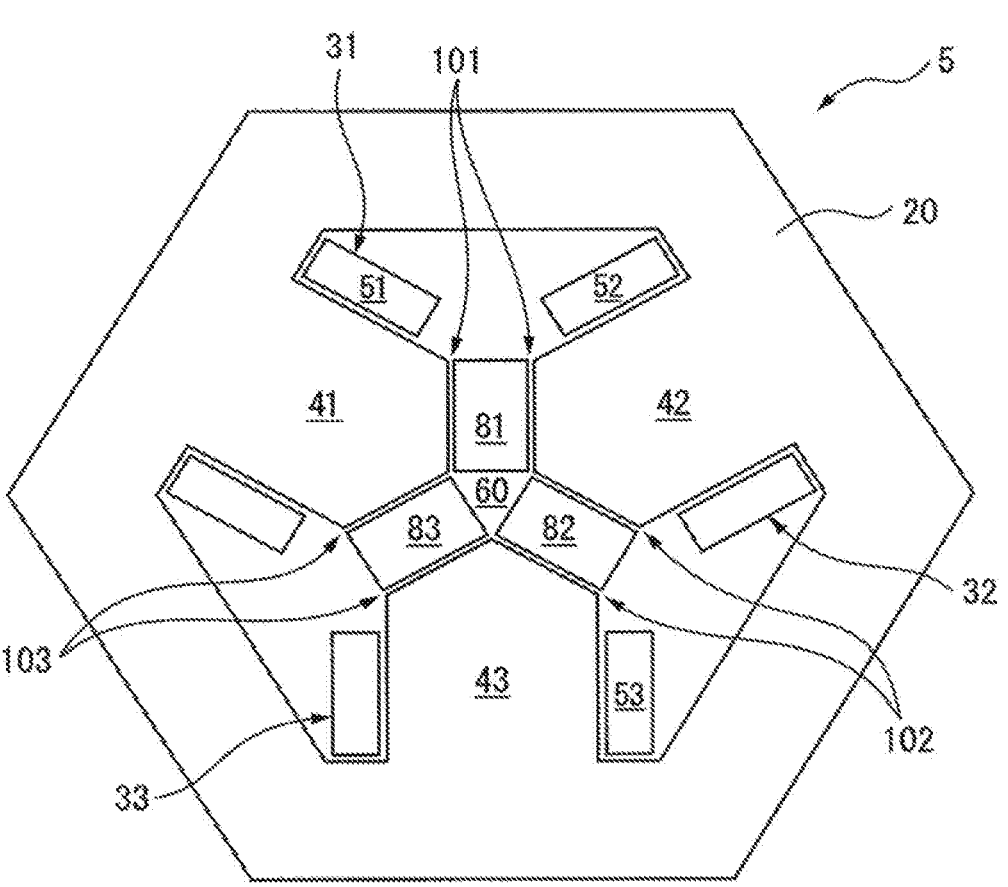
FIG. 15A is a view illustrating an alternative example in the eleventh embodiment of the present invention.
Figure 15B:
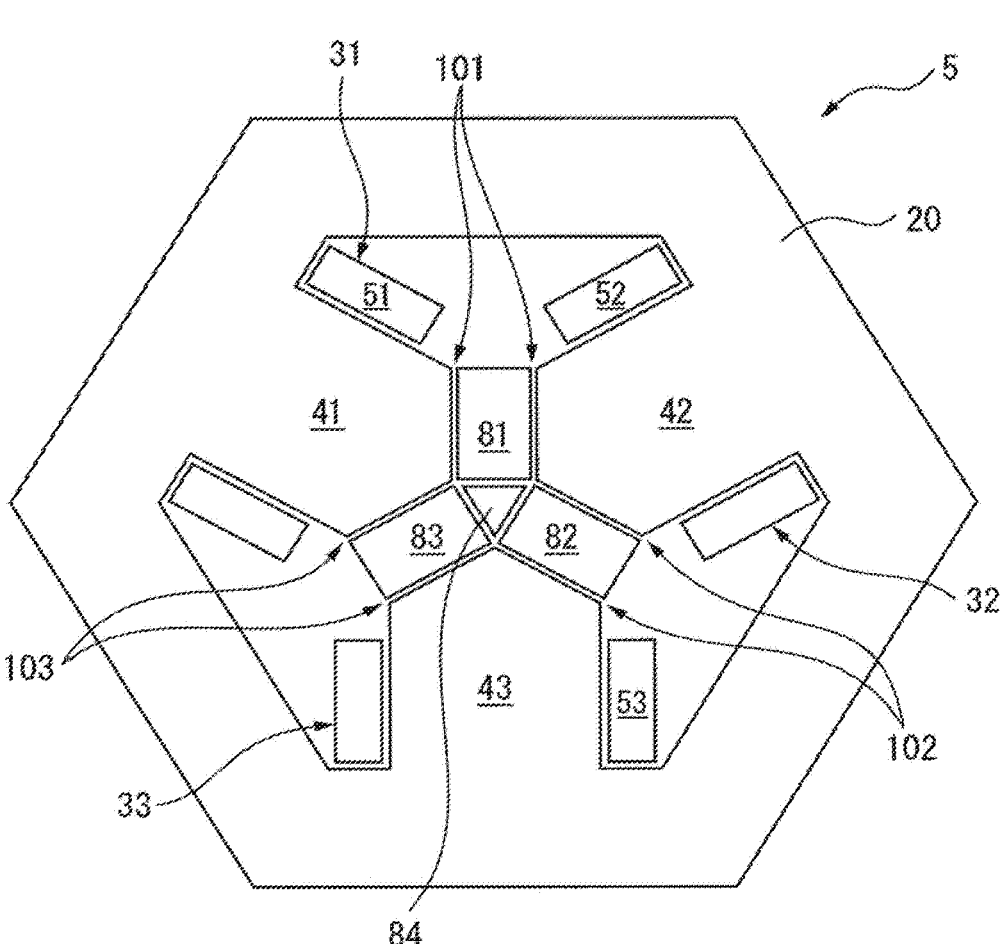
FIG. 15B is a view illustrating another alternative example in the eleventh embodiment of the present invention.
Figure 15C:
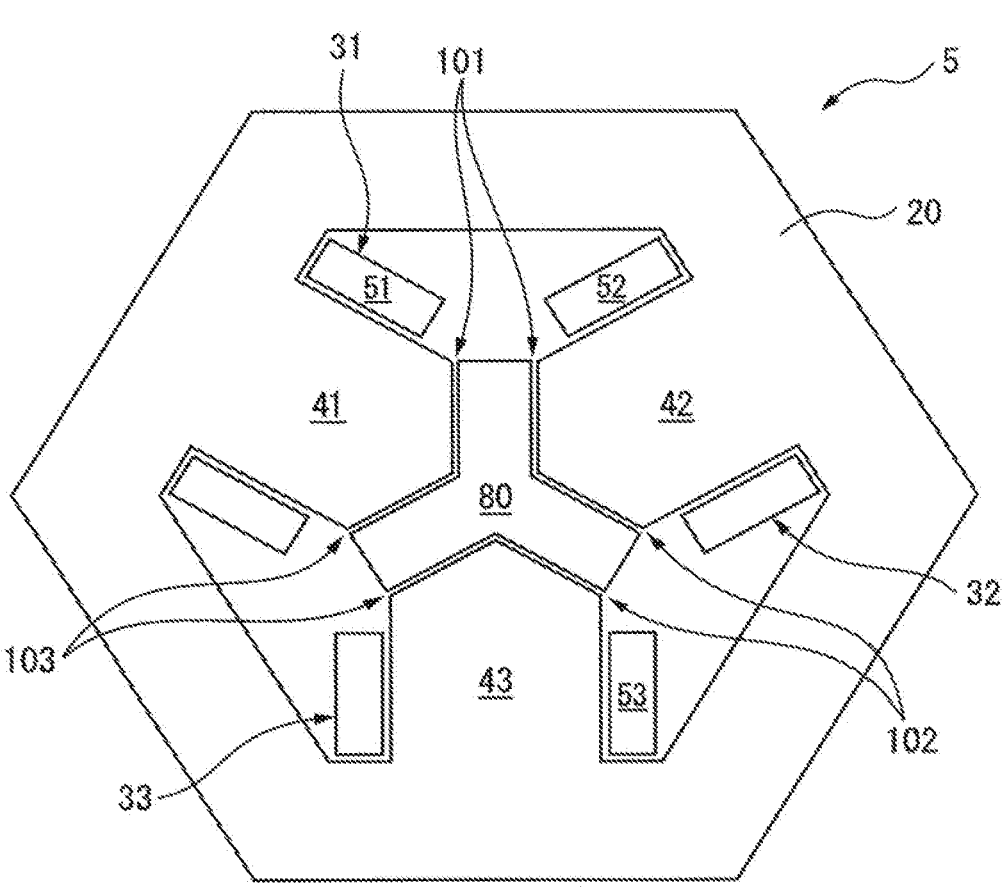
FIG. 15C is a view illustrating still another alternative example in the eleventh embodiment of the present invention.

FIG. 15A to FIG. 15C are views that illustrate an alternative example in the eleventh embodiment of the present invention, and that are similar to FIG. 14A. In FIG. 15A, the cross sections of inter-coil iron cores 81 to 83 are rectangular, and an opening 60 is formed between the inter-coil iron cores 81 to 83. In such a case, gaps 101 to 103 are similar to those described above.

Further, an inter-coil iron core 84 having an equilateral-triangular shape is additionally arranged in the opening 60 in the configuration illustrated in FIG. 15B. Gaps similar to the gaps 101 to 103 are formed between the additional inter-coil iron core 84 and the inter-coil iron cores 81 to 83.

Further, in FIG. 15C, a single inter-coil iron core 80 is arranged between iron-core coils 31 to 33. As illustrated in the drawing, the gaps 101 to 103 described above are formed between the inter-coil iron core 80 and iron cores 41 to 43. As described above, even when the number of inter-coil iron cores 81 is varied, similar effects can be obtained because the gaps 101 to 103 are similar to those described above.

Figure 16A:
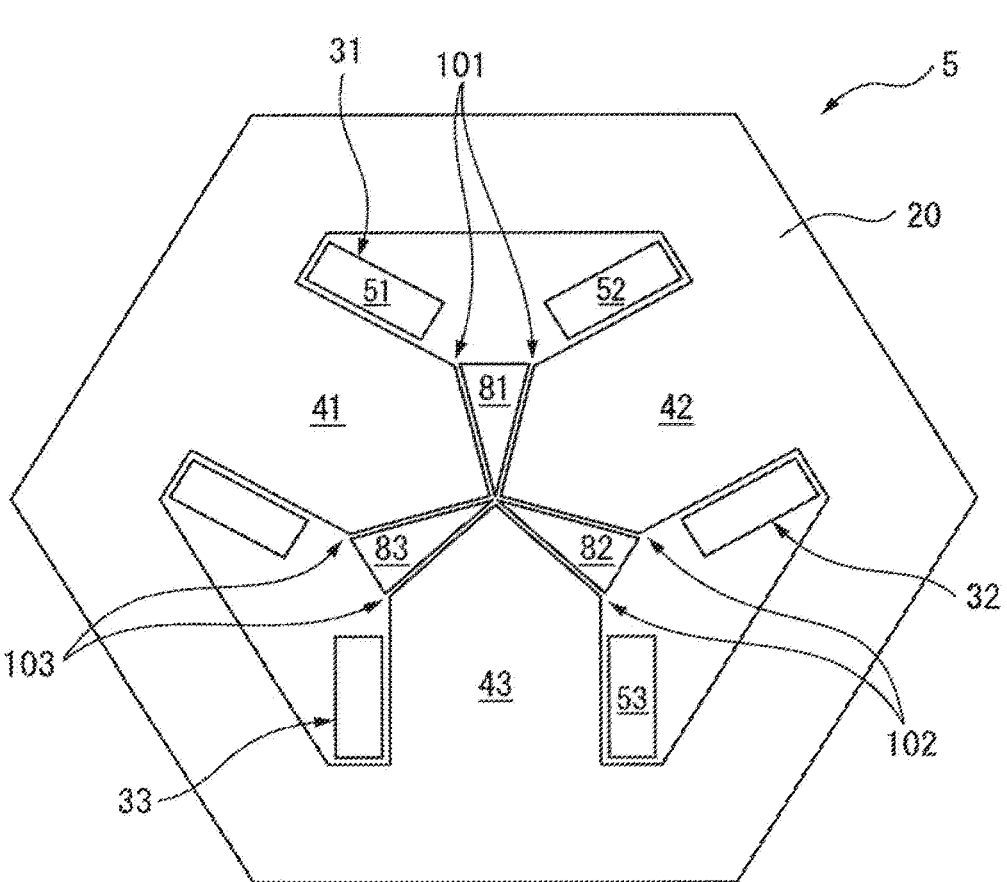
FIG. 16A is a cross-sectional view of a three-phase reactor according to a twelfth embodiment of the present invention.

FIG. 16A is a cross-sectional view of a three-phase reactor according to a twelfth embodiment of the present invention. In FIG. 16A, the front end angle of the radially inner end of each of iron cores 41 to 43 is about 90 degrees. As a result, cross sections of inter-coil iron cores 81 to 83 have an isosceles-triangular shape. In other words, each of the inter-coil iron cores 81 to 83 has two surfaces making an acute angle with each other. Gaps 101 to 103 that can magnetically connect each of the two surfaces and the iron-core coil iron cores 41 to 43 are formed between each of the two surfaces and the iron-core coil iron cores 41 to 43.

Figure 16B:
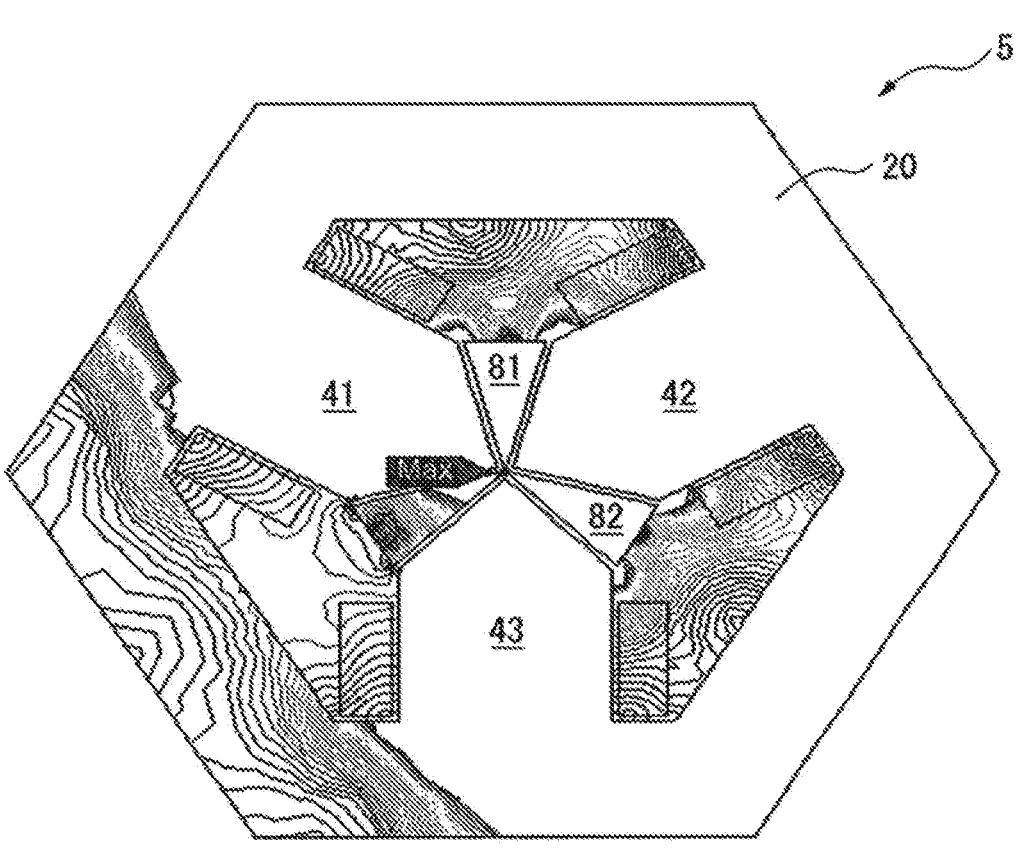
FIG. 16B is a view illustrating magnetic fluxes in the three-phase reactor illustrated in FIG. 16A.

FIG. 16B is a view illustrating magnetic fluxes in the three-phase reactor illustrated in FIG. 16A. In the present invention, as can be seen from comparisons between FIG. 16B and FIG. 13B, the number of sites in which leakage fluxes are generated from the vicinities of the gaps 101 to 103 is small, and therefore, the leakage fluxes do not penetrate coils 51 to 53 in the vicinities thereof very much. Therefore, eddy-current losses are inhibited from occurring in the coils.

Figure 16C:
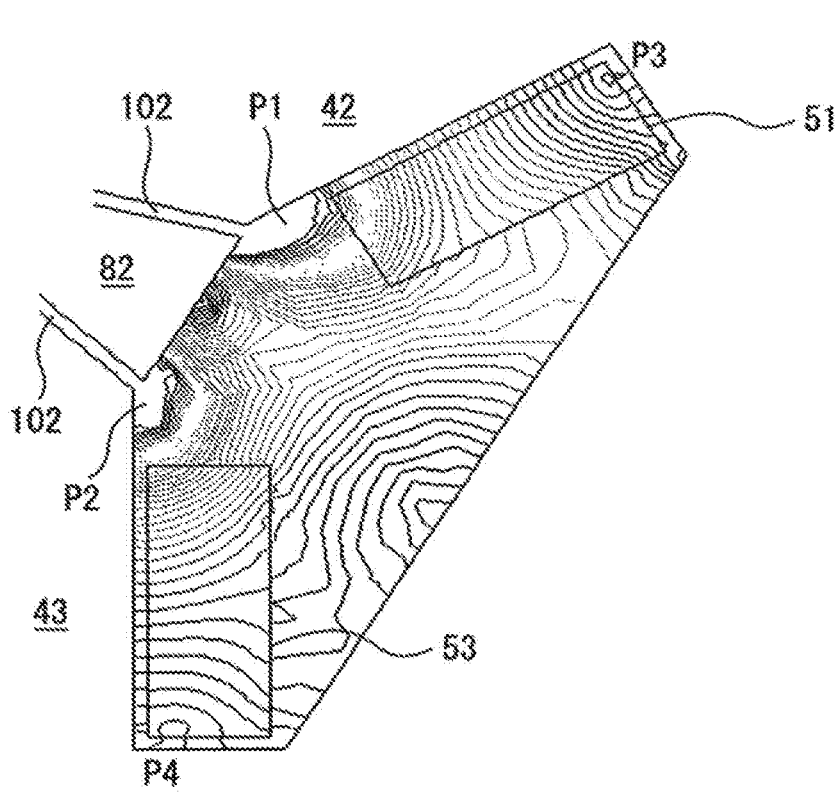
FIG. 16C is a partially enlarged view of FIG. 16B.

Further, FIG. 16C is a partially enlarged view of FIG. 16B. Magnetic flux densities B in sites P1, P2 in the gap 102 in both sides of the inter-coil iron core 82 are as relatively high as 0.08 T or more. In contrast, magnetic flux densities B in sites P3, P4 in the radially outer vicinities of the coils 52, 53 are as relatively low as 0.001 T. Sites having a magnetic flux density B of 0.08 T or more in FIG. 16C are only the sites P1, P2 in the gap 102 in both sides of the inter-coil iron core 82. Therefore, effects similar to those described above can also be obtained in the twelfth embodiment.

Further, in the twelfth embodiment, the cross sections of the inter-coil iron cores 81 to 83 are isosceles-triangular, and therefore, the areas of the gaps 101 to 103 are larger than those of the eleventh embodiment. Therefore, it is obvious that the twelfth embodiment is more effective than the eleventh embodiment. The amounts of the inter-coil iron cores 81 to 83 can also be reduced.

Figure 17:
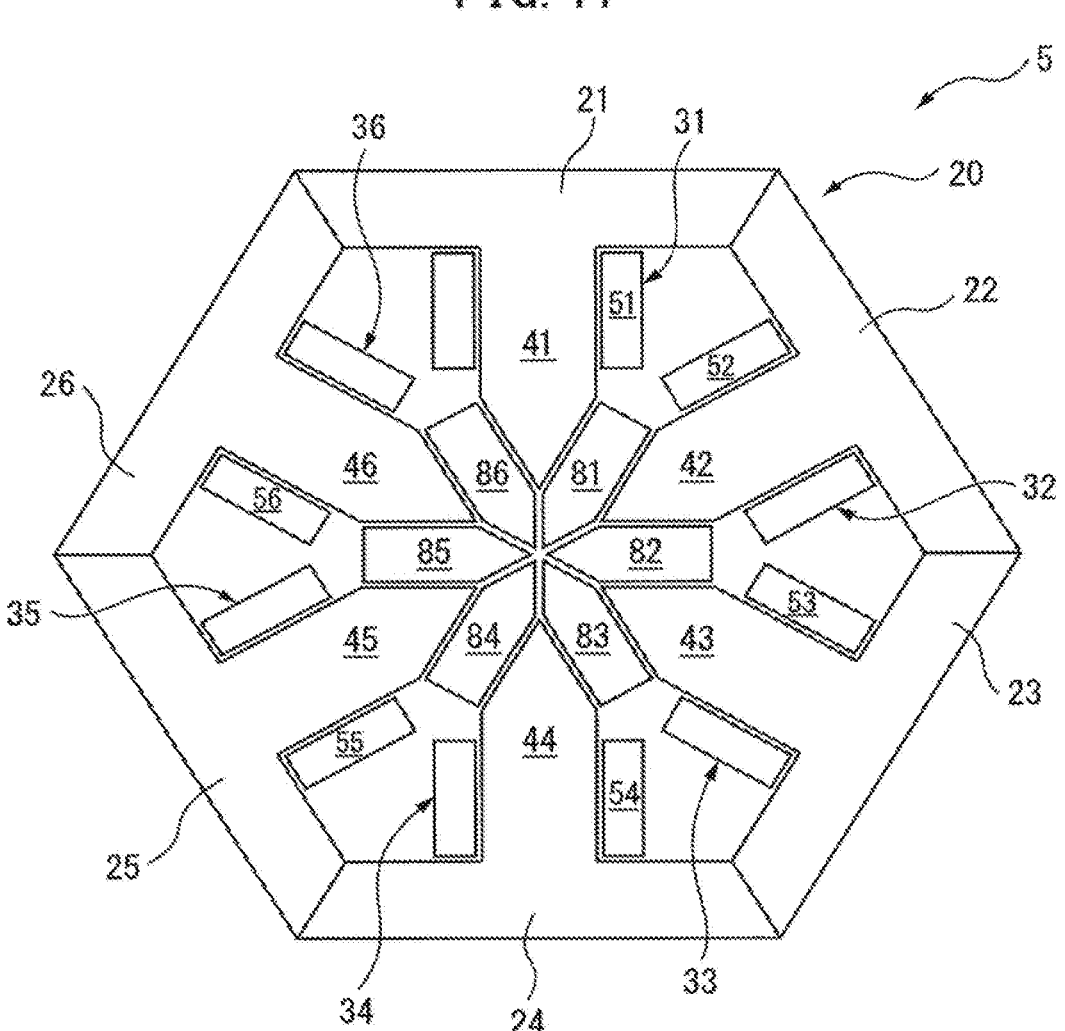
FIG. 17 is a cross-sectional view of a three-phase reactor according to a thirteenth embodiment of the present invention.

Further, FIG. 17 is a cross-sectional view of a three-phase reactor according to a thirteenth embodiment of the present invention. A three-phase reactor 5 illustrated in FIG. 17 includes: an outer peripheral iron core 20; and iron-core coils 31 to 36 similar to those described above. The iron-core coils 31 to 36 include: corresponding iron cores 41 to 46 that radially extend; and corresponding coils 51 to 56 that are wound around the iron cores.

The front end angle of the radially inner end of each of the iron cores 41 to 46 of the three-phase reactor 5 illustrated in FIG. 17 is about 60 degrees. In FIG. 17, inter-coil iron cores 81 to 86 have the same shape as each other. The cross sections of the inter-coil iron cores 81 to 86 are pentagons of which two sides are parallel to each other. In such a manner similar to the manner described above, gaps 101 to 106 (not illustrated) that can magnetically connect the inter-coil iron cores 81 to 86 and the iron cores 41 to 46 are formed between the inter-coil iron cores 81 to 86 and the iron cores 41 to 46. As described above, the three-phase reactor 5 may include the iron-core coils 31 to 36 of which the number is a multiple of 3.

It is obvious that effects that are generally similar to those described above can also be obtained in the thirteenth embodiment. Further, in the thirteenth embodiment, the number of the iron-core coils 31 to 36 is intended to be a multiple of 3, and therefore, plural iron-core coils exist for one phase. The cross-sectional area of each of the iron-core coils can be reduced by connecting the plural iron-core coils in parallel to each other.

Figure 18A:
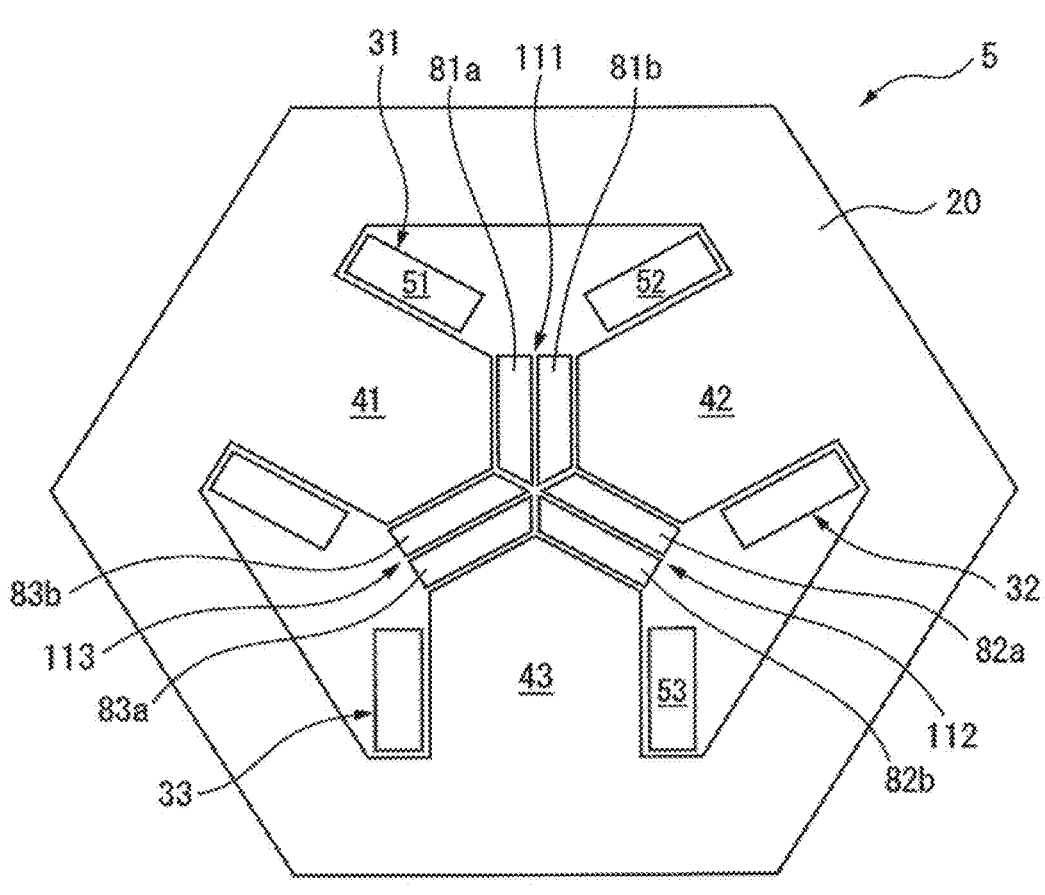
FIG. 18A is a cross-sectional view of a three-phase reactor according to a fourteenth embodiment of the present invention.

FIG. 18A is a cross-sectional view of a three-phase reactor according to a fourteenth embodiment of the present invention. Inter-coil iron cores 81 to 83 in a three-phase reactor 5 illustrated in FIG. 18A include: corresponding first inter-coil iron-core units 81a to 83a; and corresponding second inter-coil iron-core units 81b to 83b. The first inter-coil iron-core unit 81a and the second inter-coil iron-core unit 81b are placed side by side. The same also applies to the other first inter-coil iron-core units 82a, 83a and the other second inter-coil iron-core units 82b, 83b.

Further, inter-coil iron-core unit gaps 131 to 133 that can magnetically connect the first inter-coil iron-core units 81a to 83a and the second inter-coil iron-core units 81b to 83b are formed between the first inter-coil iron-core units 81a to 83a and the second inter-coil iron-core units 81b to 83b. Such a gap 101 as described above (not illustrated in FIG. 18A or the like) is intended to be formed between the first inter-coil iron-core unit 81a and an iron core 41, and between the second inter-coil iron-core unit 81b and an iron core 42. Other gaps 102, 103 are also intended to be similarly formed.

Figure 18B:
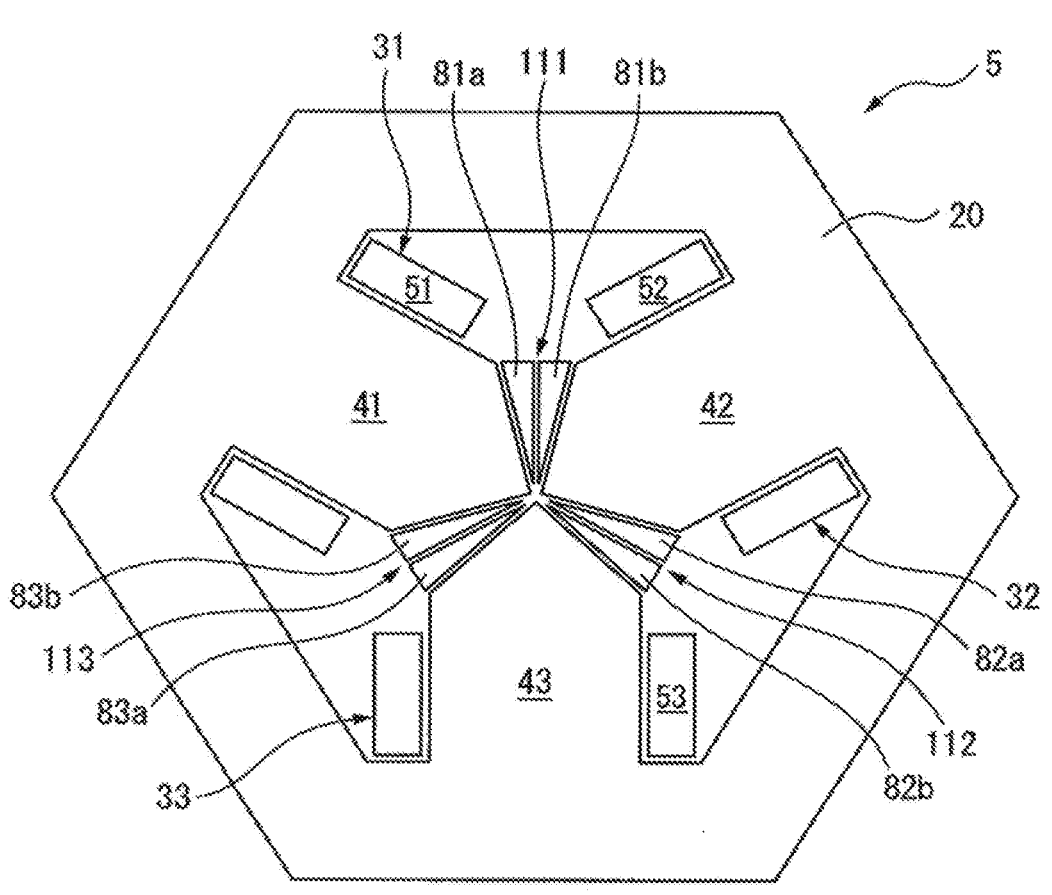
FIG. 18B is a cross-sectional view of another three-phase reactor according to the fourteenth embodiment of the present invention.

Further, FIG. 18B is a cross-sectional view of another three-phase reactor according to the fourteenth embodiment of the present invention. In such a case, inter-coil iron cores 81 to 83 also include corresponding first inter-coil iron-core units 81a to 83a and corresponding second inter-coil iron-core units 81*b* to 83*b* that are placed side by side. The same also applies to the other first inter-coil iron-core units 82*a*, 83*a* and the other second inter-coil iron-core units 82*b*, 83*b*. Further, inter-coil iron-core unit gaps 131 to 133 that enable magnetic connections, and such gaps 101 to 103 as described above are also similarly formed.

In other words, the configuration illustrated in FIG. 18A is a configuration in which the inter-coil iron cores 81 to 83 illustrated in FIG. 14A are divided in half by planes that is parallel to the gaps 101 to 103. Further, the configuration illustrated in FIG. 18B is a configuration in which the inter-coil iron cores 81 to 83 illustrated in FIG. 15A are divided in half. The inter-coil iron cores 81 to 83 include the corresponding inter-coil iron-core unit gaps 131 to 133 formed between the inter-coil iron-core units 81*a* to 83*a* and 81*b* to 83*b*.

Figure 18C:
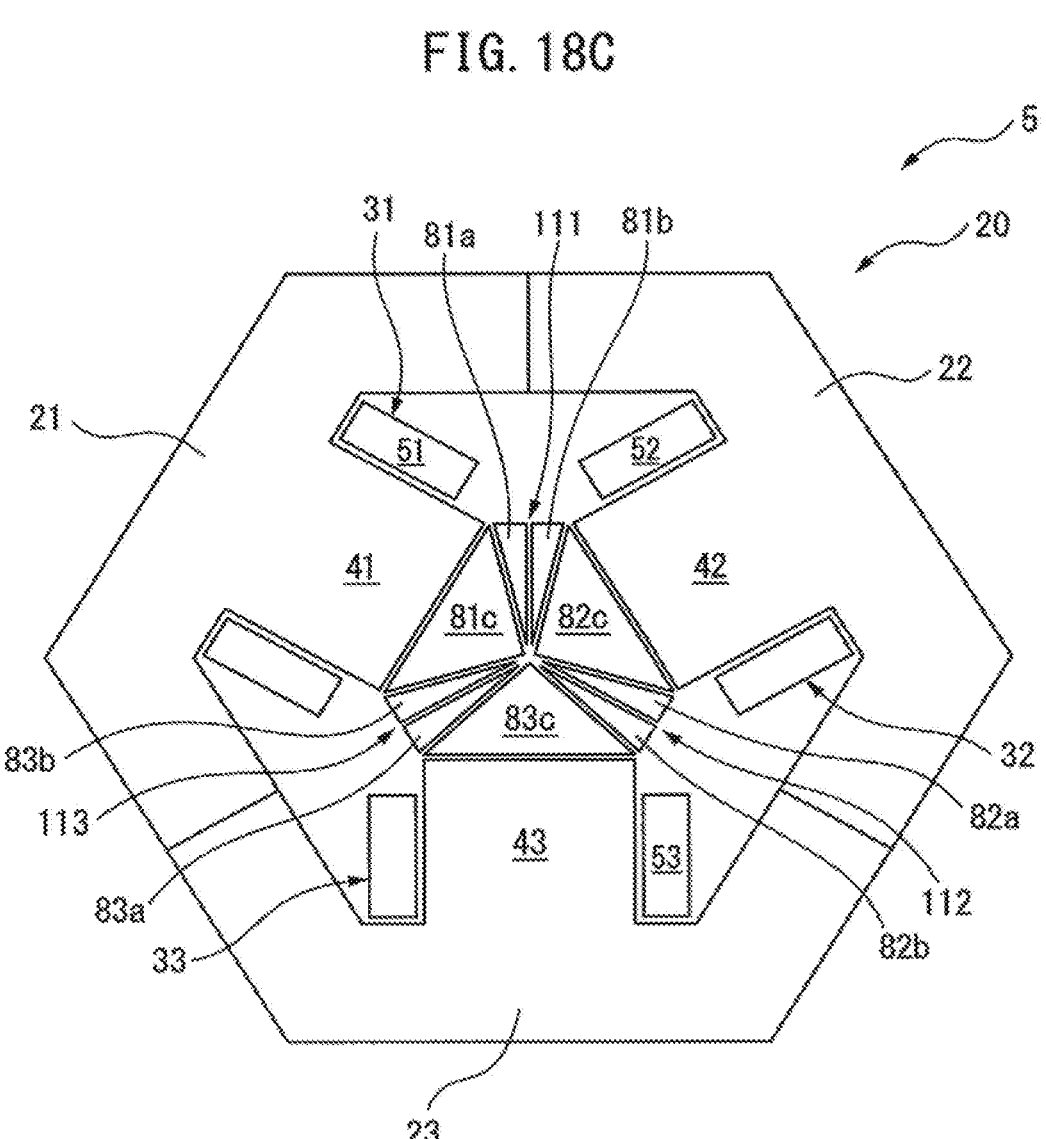
FIG. 18C is a cross-sectional view of still another three-phase reactor according to the fourteenth embodiment of the present invention.

Further, FIG. 18C is a cross-sectional view of still another three-phase reactor according to the fourteenth embodiment of the present invention. In the configuration illustrated in FIG. 18C, the front end units of the iron cores 41 to 43 in the configuration illustrated in FIG. 18B are replaced with inter-coil iron cores 81*c* to 83*c*. Accordingly, the configuration illustrated in FIG. 18C includes first inter-coil iron-core units 81*a* to 83*a*, second inter-coil iron-core units 81*b* to 83*b*, and the third inter-coil iron-core units 81*c* to 83*c*.

As can be seen from FIG. 18C, the first inter-coil iron-core units 81*a* to 83*a* and the second inter-coil iron-core units 81*b* to 83*b* have shapes symmetrical to each other. However, the third inter-coil iron-core units 81*c* to 83*c* have isosceles-triangular shapes different from those of the first inter-coil iron-core units 81*a* to 83*a* and the second inter-coil iron-core units 81*b* to 83*b*. Further, the third inter-coil iron-core units 81*c* to 83*c* come contact with neither the adjacent other inter-coil iron-core units nor iron cores 41 to 43, and gaps are formed.

As described above, in the fourteenth embodiment, both the gaps 101 to 103 and the inter-coil iron-core unit gaps 131 to 133 are formed, and therefore, the dimension of each gap per site can be reduced. As a result, magnetic fluxes leaking out of the gaps can be reduced, and therefore, eddy-current losses in the coils, caused by the magnetic leakage fluxes, can be further reduced. It will be appreciated that each of the inter-coil iron cores 81 to 83 may include three or more inter-coil iron-core units arranged in a single row.

Figure 19:
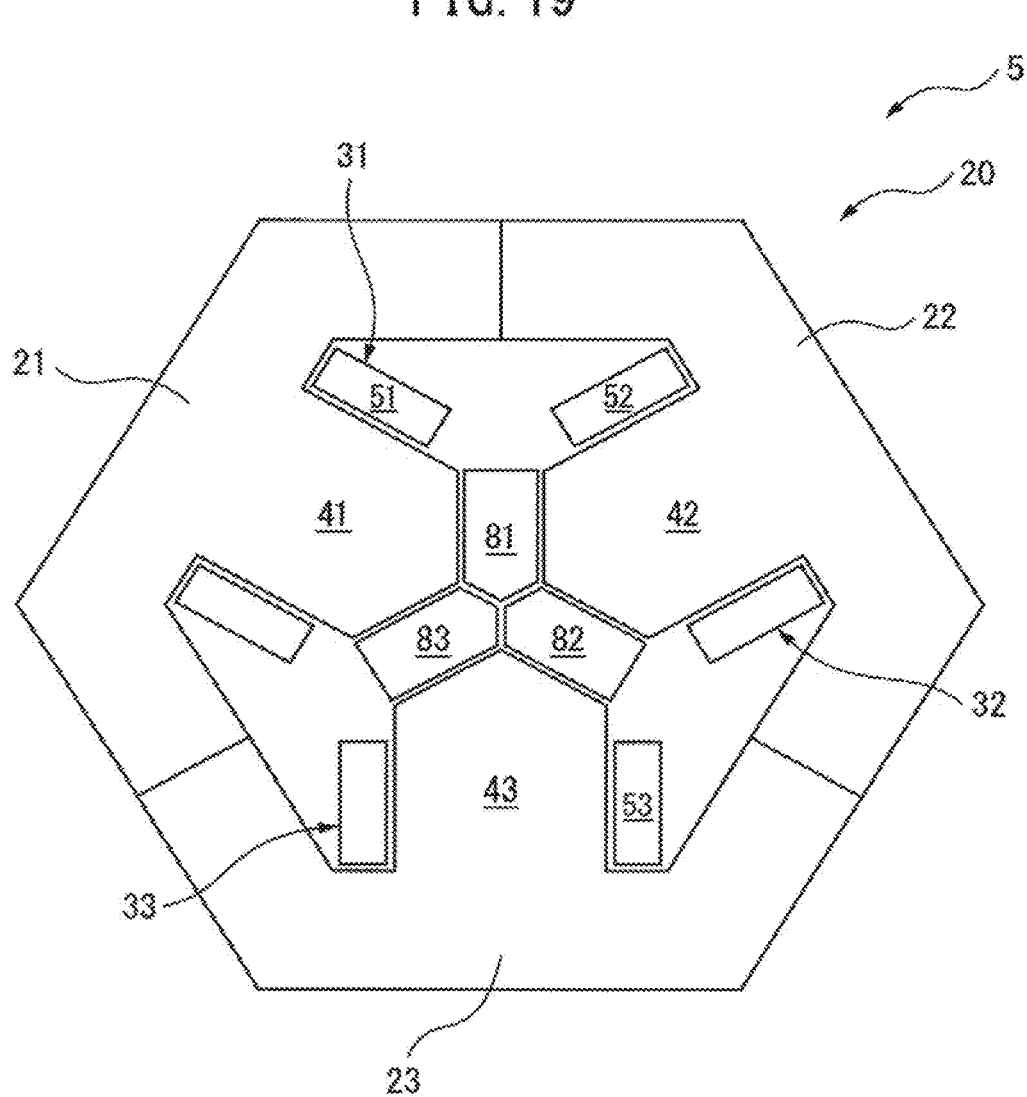
FIG. 19 is a cross-sectional view of a three-phase reactor according to a fifteenth embodiment of the present invention.

FIG. 19 is a cross-sectional view of a three-phase reactor according to a fifteenth embodiment of the present invention. Iron-core coils 31 to 33 in a three-phase reactor 5 illustrated in FIG. 19 are generally similar to those described with reference to FIG. 14A. In the fifteenth embodiment, an outer peripheral iron core 20 includes plural, for example, three outer peripheral iron-core units 21 to 23. The outer peripheral iron-core units 21 to 23 include iron cores 41 to 43, respectively. In FIG. 19, the outer peripheral iron-core units 21 to 23 come in contact with each other. In the embodiment illustrated in FIG. 19, the outer peripheral iron core 20 can be easily manufactured even when the outer peripheral iron core 20 is large. In the embodiment illustrated in FIG. 17, the outer peripheral iron core 20 includes plural outer peripheral iron-core units 21 to 26.

Figure 20:
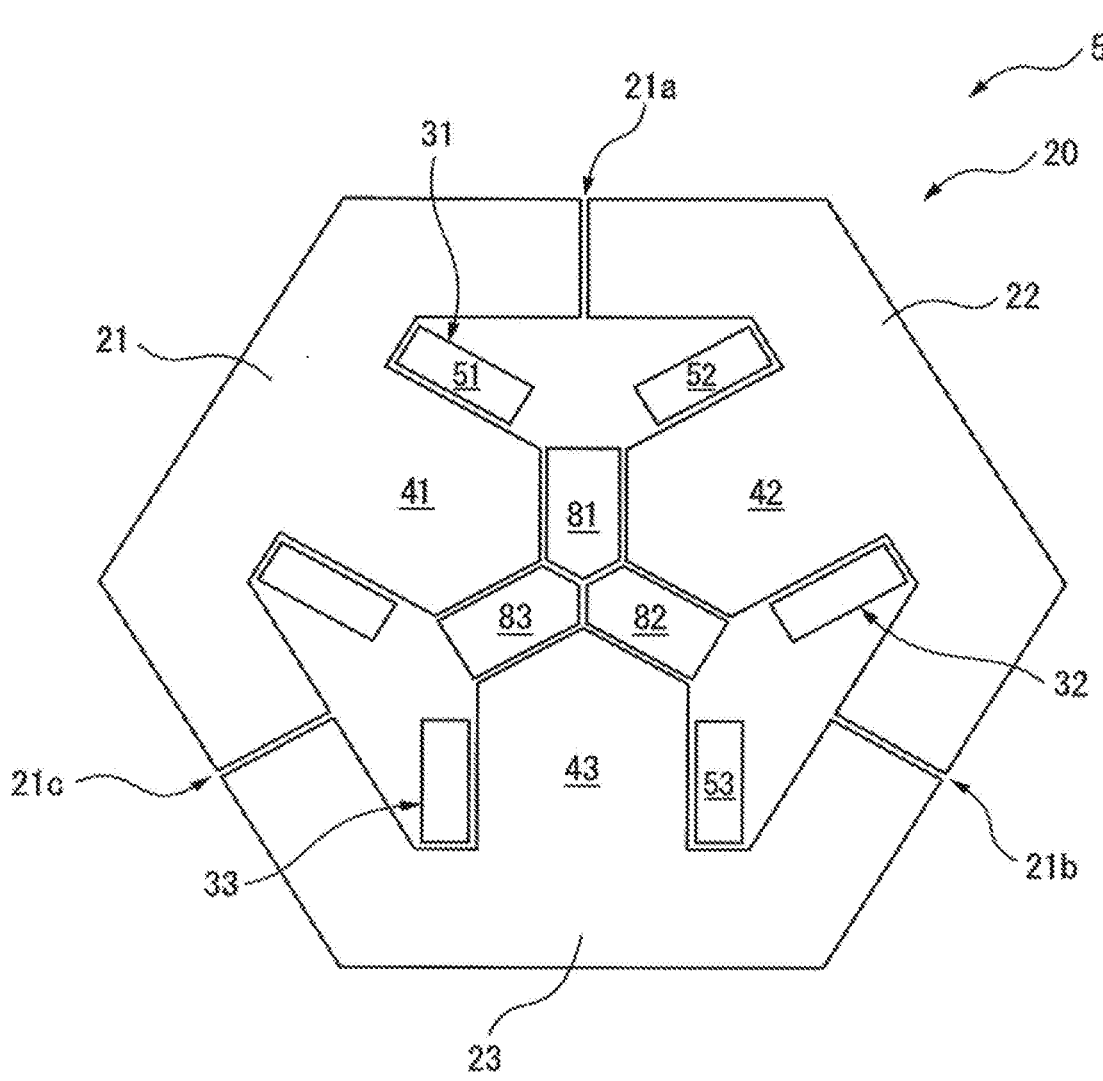
FIG. 20 is a cross-sectional view of a three-phase reactor according to a sixteenth embodiment of the present invention.

FIG. 20 is a cross-sectional view of a three-phase reactor according to a sixteenth embodiment of the present invention. In the sixteenth embodiment, an outer peripheral iron-core unit gap 21*a* that can magnetically connect an outer peripheral iron-core unit 21 and an outer peripheral iron-core unit 22 is formed between the outer peripheral iron-core unit 21 and the outer peripheral iron-core unit 22. Similarly, outer peripheral iron-core unit gaps 21*b*, 21*c* that can magnetically connect the outer peripheral iron-core unit 22 and an outer peripheral iron-core unit 23, and the outer peripheral iron-core unit 23 and the outer peripheral iron-core unit 21, respectively, are formed between the outer peripheral iron-core unit 22 and an outer peripheral iron-core unit 23, and between the outer peripheral iron-core unit 23 and the outer peripheral iron-core unit 21, respectively.

In other words, each of the outer peripheral iron-core units 21 to 23 is arranged through each of the outer peripheral iron-core unit gaps 21*a* to 21*c*. In such a case, the outer peripheral iron-core unit gaps 21*a* to 21*c* can be adjusted by adjusting the lengths of the outer peripheral iron-core units 21 to 23. It is obvious that as a result, an imbalance in inductances in three-phase reactor 5 can be adjusted.

A three-phase reactor 5 illustrated in FIG. 20 differs from the three-phase reactor 5 illustrated in FIG. 19 only in view of having the outer peripheral iron-core unit gaps 21*a* to 21*c*. In other words, the outer peripheral iron-core unit gaps 21*a* to 21*c* are not formed between the adjacent outer peripheral iron-core units 21 to 23 in the fifteenth embodiment. In the embodiments illustrated in FIG. 19 and FIG. 20, the outer peripheral iron core 20 can be easily manufactured even when the outer peripheral iron core 20 is large.

Figure 21:
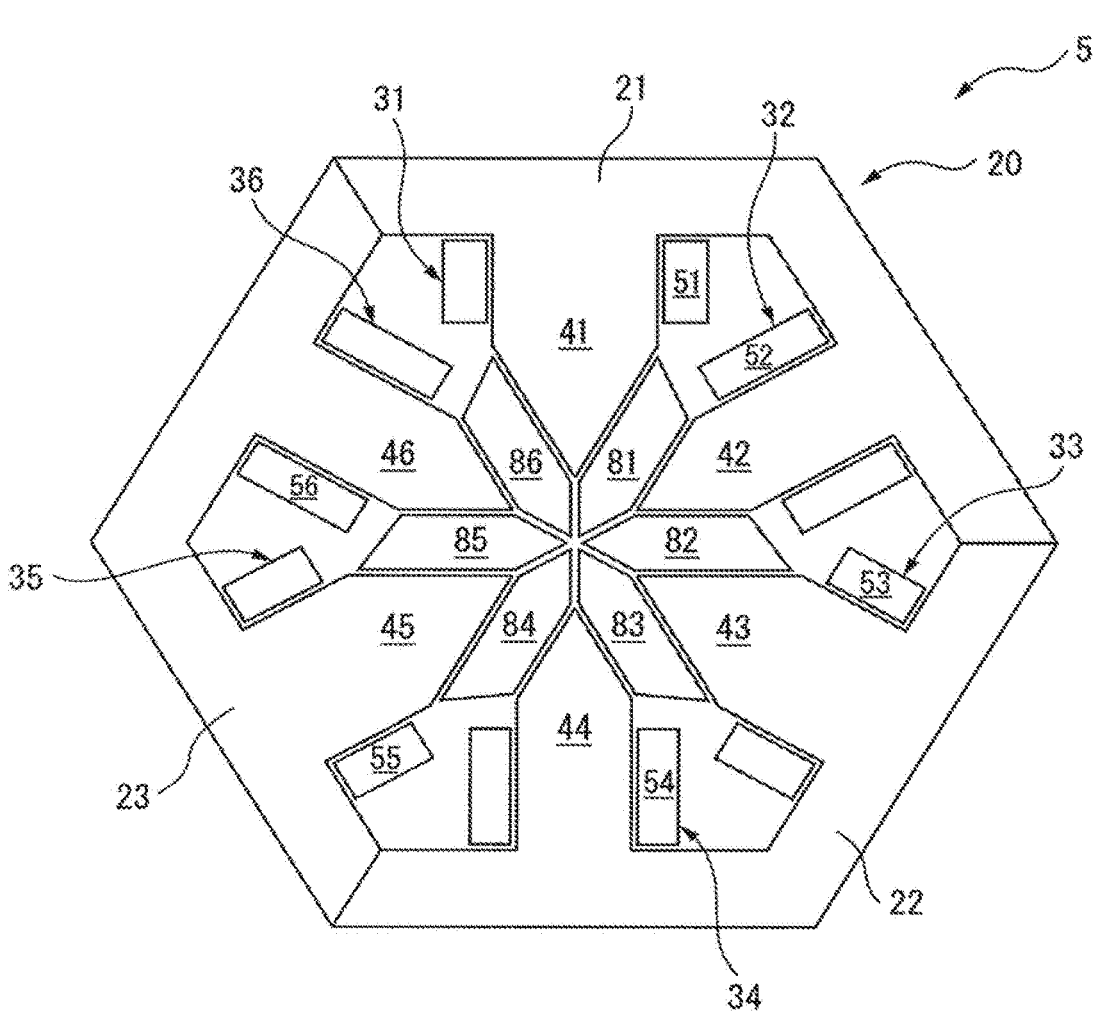
FIG. 21 is a cross-sectional view of a three-phase reactor according to a seventeenth embodiment of the present invention.

FIG. 21 is a cross-sectional view of a three-phase reactor according to a seventeenth embodiment of the present invention. A three-phase reactor 5 illustrated in FIG. 21 is generally similar to the three-phase reactor 5 illustrated in FIG. 4. However, iron cores 41, 43, and 45 in the three-phase reactor 5 illustrated in FIG. 21 are wider than other iron cores 42, 44, and 46. Further, the cross-sectional areas of coils 51, 53, and 55 wound around the iron cores 41, 43, and 45 are smaller than those of coils 52, 54, and 56 wound around the other iron cores 42, 44, and 46.

In other words, the three-phase reactor 5 illustrated in FIG. 21 includes a first set including three iron-core coils 31, 33, and 35, and a second set including three other iron-core coils 32, 34, and 36. Each of the first set and the second set alternately includes three iron-core coils of the six iron-core coils 31 to 36. The iron-core coils are rotationally symmetrically arranged in each of the first set and the second set.

In the three-phase reactor 5 illustrated in FIG. 21, the dimensions of the iron cores, and the cross-sectional areas and winding numbers of the coils are intended to differ between the first set and the second set. The dimensions of the gaps in the first set of the three-phase reactor 5 may be intended to differ from the dimensions of the gaps in the second set.

In the embodiment illustrated in FIG. 21, two reactors having different properties can be substantially included in one three-phase reactor 5. In the embodiment illustrated in FIG. 4, two reactors having the same property can be included in one three-phase reactor 5. In the embodiments illustrated in FIG. 17 and FIG. 21, an installation space can be reduced because the two reactors having the same or different properties can be included in one reactor. It is obvious that inductance values can be adjusted by connecting two reactors in series or parallel to each other. Three or more reactors having different properties or the same properties, i.e., the three or more sets described above may be included in one three-phase reactor 5. It is obvious that similar effects can also be obtained in such a case.

Figure 22:
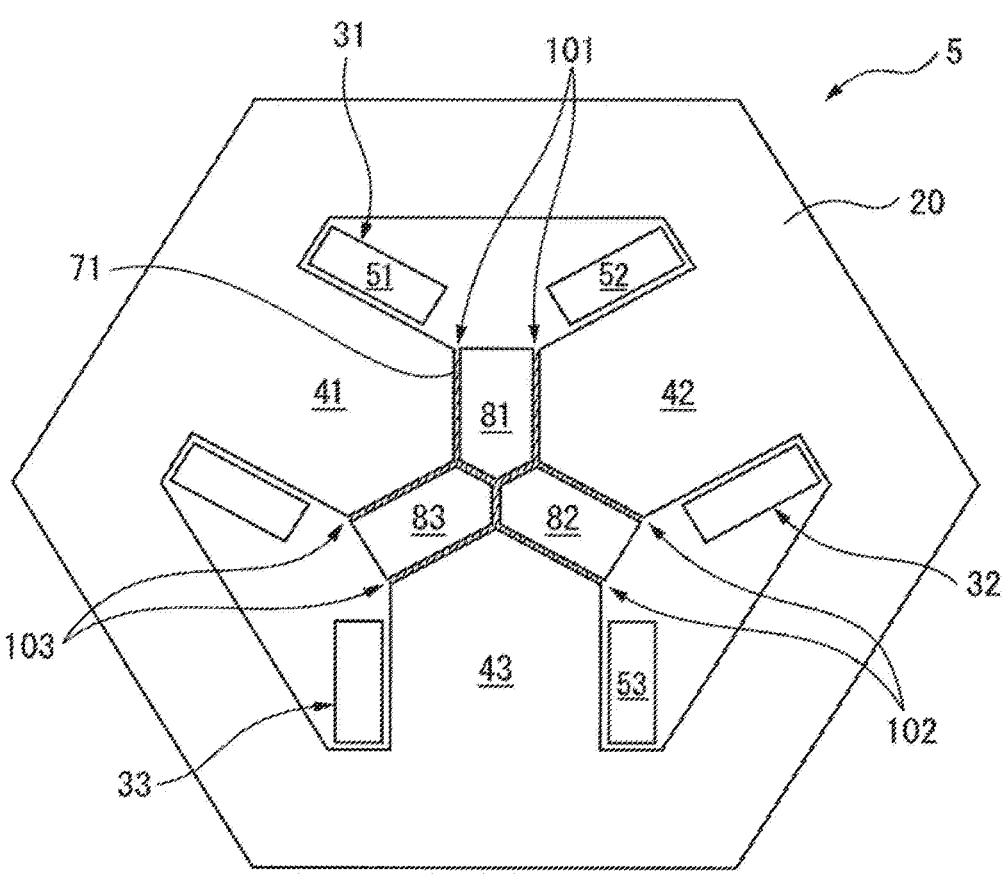
FIG. 22 is a cross-sectional view of a three-phase reactor according to an eighteenth embodiment of the present invention.

FIG. 22 is a cross-sectional view of a three-phase reactor according to an eighteenth embodiment of the present invention. A three-phase reactor 5 illustrated in FIG. 22 is generally similar to the three-phase reactor 5 described with reference to FIG. 14A, and therefore, descriptions of the three-phase reactor 5 are omitted. As illustrated in FIG. 22, a gap member 71 made of resin is filled into gaps 101 to 103 in the three-phase reactor 5.

In such a case, the gap member 71 can be produced by simply filling the resin into the gaps 101 to 103, and curing the resin. Therefore, the gap member 71 can be easily produced. A gap member 71 having a shape similar to the shape of the gap member 71 illustrated in FIG. 22 may be produced in advance, and may be inserted into the gaps 101 to 103 instead of filling the resin. In such a case, the gap member 71 suppresses vibrations of iron cores coming in contact with the gaps 101 to 103, and inter-coil iron cores 81 to 83, and therefore, noise generated from the iron cores can be reduced. The gap members 71 may be an insulating material.

Figure 23:
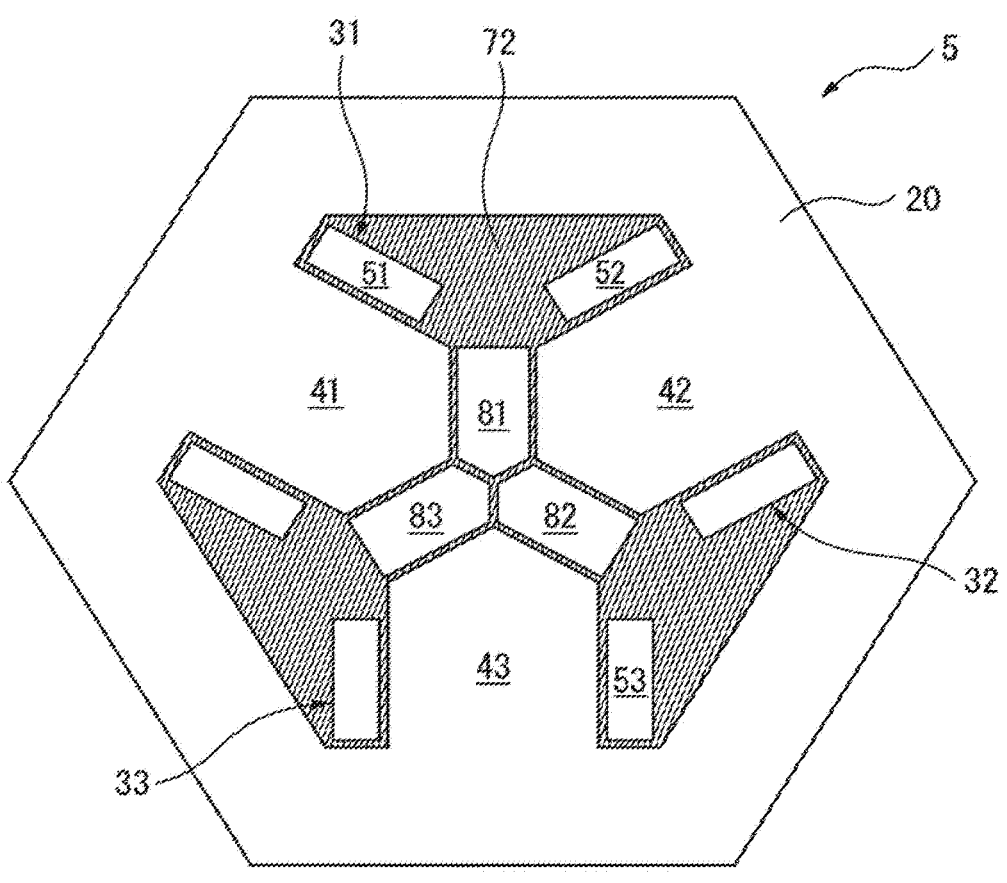
FIG. 23 is a cross-sectional view of a three-phase reactor according to a nineteenth embodiment of the present invention.

Further, FIG. 23 is a cross-sectional view of a three-phase reactor according to a nineteenth embodiment of the present invention. A three-phase reactor 5 illustrated in FIG. 23 is generally similar to the three-phase reactor 5 described with reference to FIG. 14A, and therefore, descriptions of the three-phase reactor 5 are omitted. As illustrated in FIG. 23, an insulating material 72 made of resin is filled into the inside of an outer peripheral iron core 20 in the three-phase reactor 5. The insulating material 72 may be a gap member.

In such a case, the insulating material 72 can also be easily produced by simply filling the resin into the inside of the outer peripheral iron core 20, and curing the resin. In such a case, the insulating material 72 suppresses vibrations of iron-core coils 31 to 33, the outer peripheral iron core 20, and inter-coil iron cores 81 to 83, whereby generated noise can be reduced. Further, temperature equilibrium between the iron-core coils 31 to 33, the outer peripheral iron core 20, and inter-coil iron cores 81 to 83 can be promoted in the embodiment illustrated in FIG. 23.

Figure 24A:
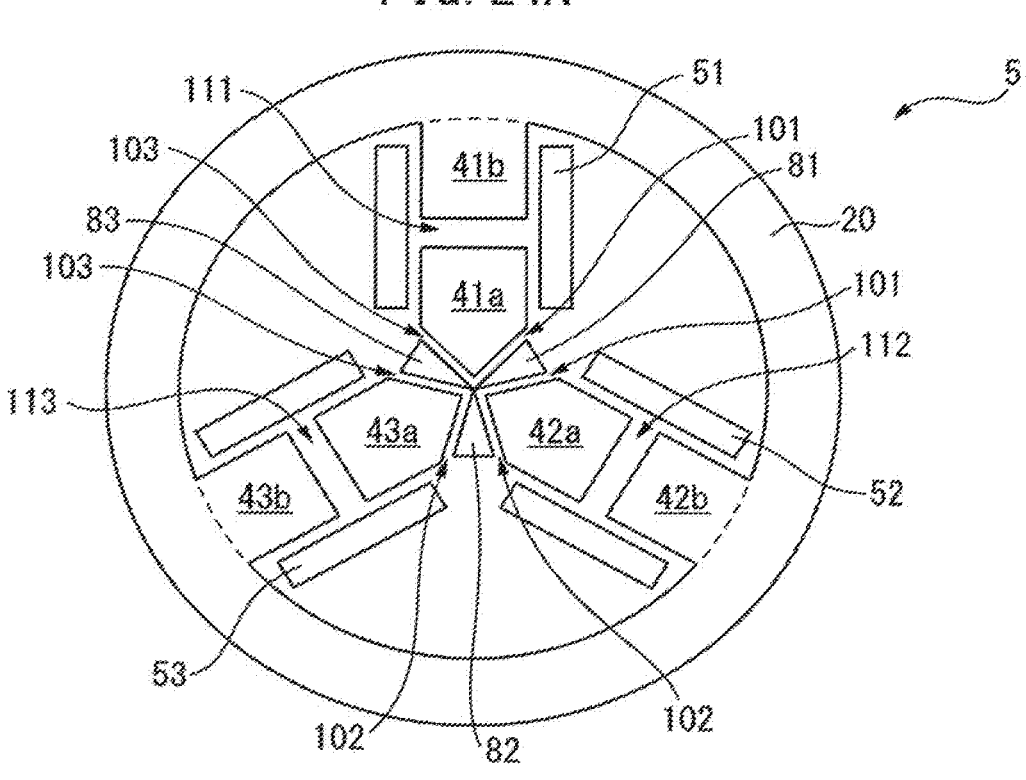
FIG. 24A is a cross-sectional view of a three-phase reactor according to still another embodiment of the present invention.
Figure 24B:
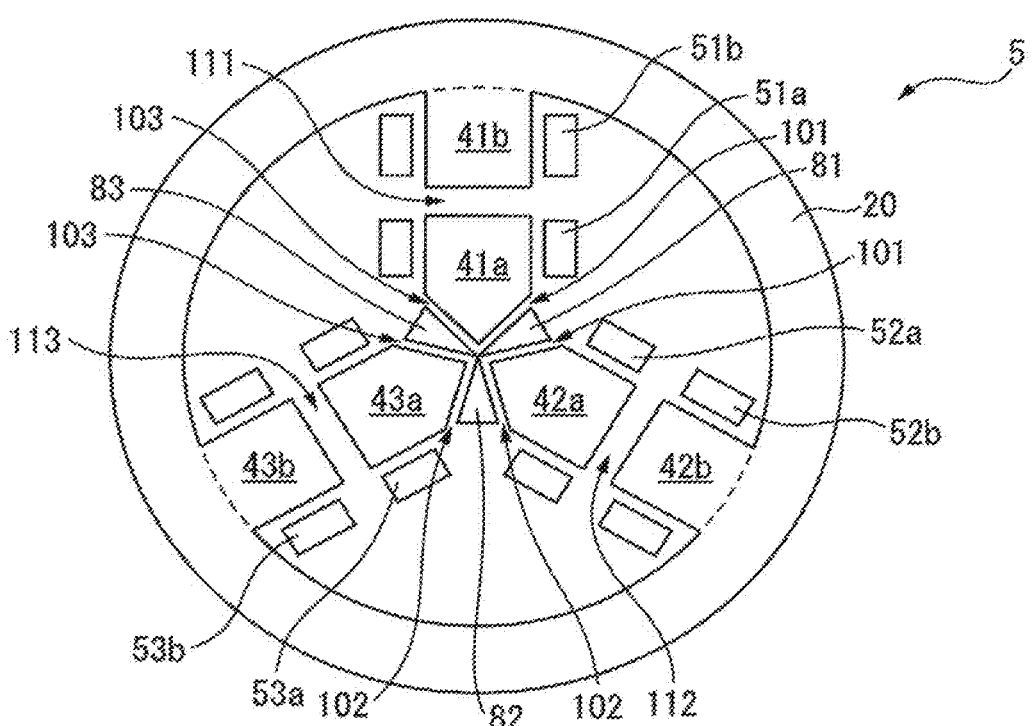
FIG. 24B is a cross-sectional view of another three-phase reactor according to still another embodiment of the present invention.

FIG. 24A and FIG. 24B are cross-sectional views of three-phase reactors according to still another embodiment of the present invention. FIG. 24A and FIG. 24B are the views that are generally similar to FIG. 3A and FIG. 3B, and therefore, redundant descriptions thereof are omitted. The same also applies to the other drawings.

In FIG. 24A and FIG. 24B, three inter-coil iron cores 81 to 83 are arranged between iron cores 41 to 43 in iron-core coils 31 to 33. Specifically, the inter-coil iron cores 81 to 83 are arranged in the vicinities of the radially inner ends of the iron cores 41 to 43. Further, a gap 101 that can magnetically connect the inter-coil iron core 81 and the iron cores 41, 42 is formed between the inter-coil iron core 81 and the iron cores 41, 42. The same also applies to the other inter-coil iron cores 82, 83.

In such a case, both the gaps 101 to 103 and iron-core unit gaps 111 to 113 are formed, and therefore, the dimension of each gap per site can be reduced. It is obvious that as a result, magnetic fluxes leaking out of the gaps can be reduced, and therefore, eddy-current losses in the coils, caused by the magnetic leakage fluxes, can be reduced.

Figure 25:
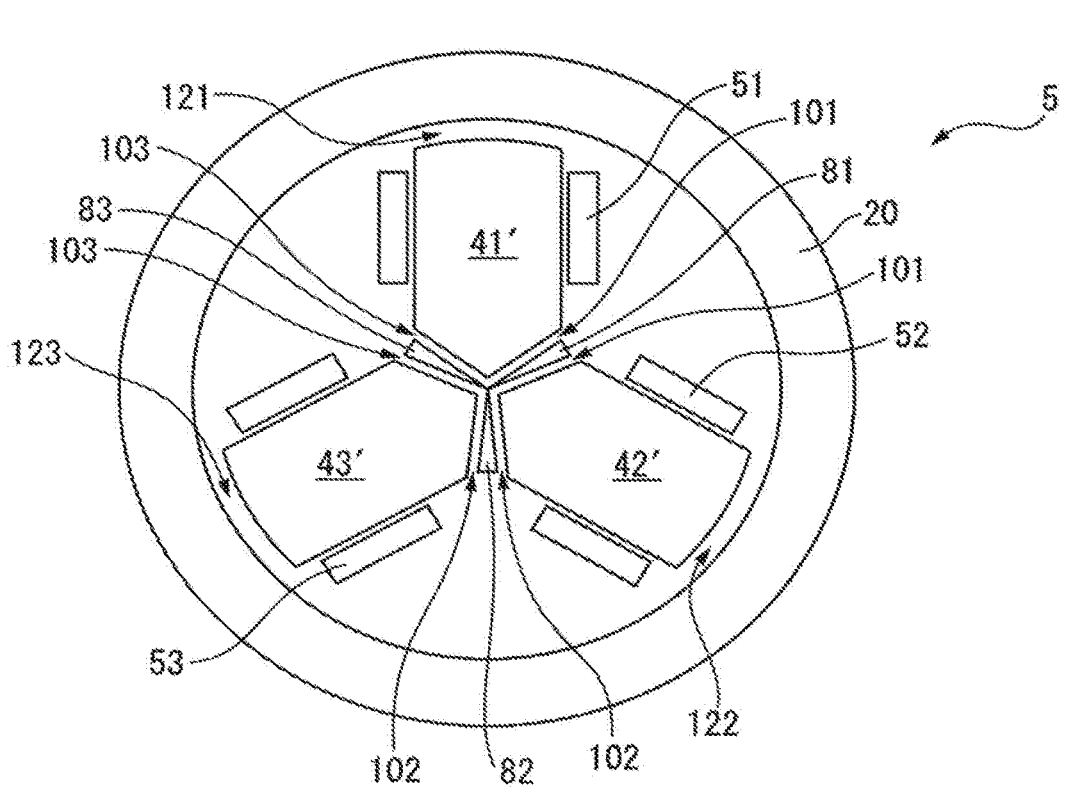
FIG. 25 is a cross-sectional view of a three-phase reactor according to still another embodiment of the present invention.

Further, FIG. 25 is a cross-sectional view of a three-phase reactor, similar to that in FIG. 4, according to a still other embodiment of the present invention. Iron-core coils 31 to 33 in a three-phase reactor 5 illustrated in FIG. 25 includes: iron cores 41' to 43' that radially extend; and coils 51 to 53 wound around the iron cores. Three inter-coil iron cores 81 to 83 are arranged between the iron cores 41' to 43'. Further, a gap 101 that can magnetically connect the inter-coil iron core 81 and the iron cores 41, 42 is formed between the inter-coil iron core 81 and the iron cores 41, 42. The same also applies to the other inter-coil iron cores 82, 83.

In such a case, both the gaps 101 to 103 and outer peripheral iron-core gaps 121 to 123 are formed, and therefore, the dimension of each gap per site can be reduced. Further, the effect of inhibiting heat generated from the iron-core coils from being transferred to outer peripheral iron cores can be obtained.

Figure 26:
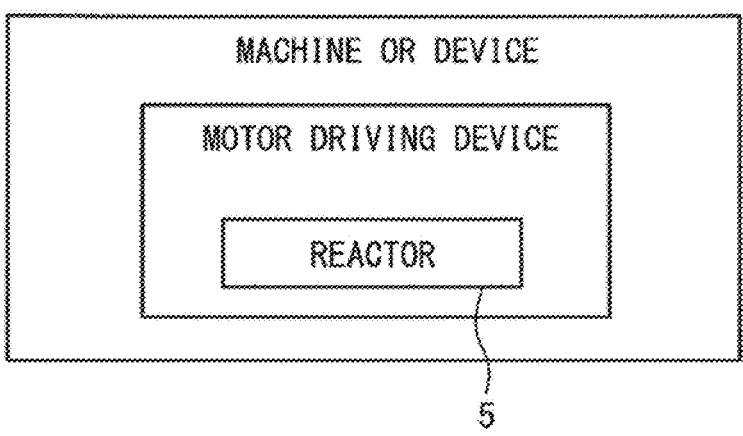
FIG. 26 is a view illustrating a machine or device including a three-phase reactor of the present invention.

FIG. 26 is a view illustrating a machine or device including a three-phase reactor of the present invention. In FIG. 26, a three-phase reactor 5 is used in a motor driving device. The machine or the device includes such a motor driving device.

Figure 27:
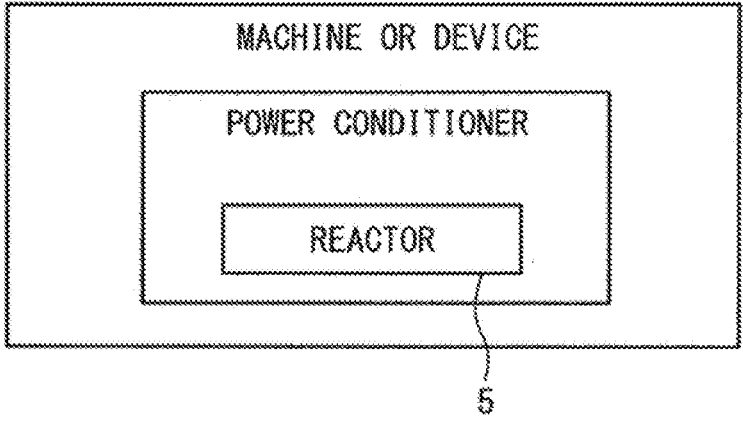
FIG. 27 is a view illustrating another machine or device including a three-phase reactor of the present invention.

FIG. 27 is a view illustrating another machine or device including a three-phase reactor of the present invention. In FIG. 27, a three-phase reactor 5 is included in a power conditioner. The machine or the device includes such a power conditioner.

It is obvious that in such a case, a motor driving device or the like including the three-phase reactor 5 can be easily provided. Combinations of some of the embodiments described above as appropriate are within the scope of the present invention.

Advantageous Effects of Invention

In the first aspect of the present invention, differences in magnetic path lengths between phases are small in comparison with reactors having conventional structures, and therefore, an imbalance in inductances, caused by the differences in the magnetic path lengths, can be reduced. Further, most of the at least three iron-core coils are surrounded by the outer peripheral iron core, and therefore, the rate of magnetic fields generated from the coils and leaking out to the outside of the outer peripheral iron core can be reduced. Further, the gaps having optional thicknesses can be inexpensively disposed, and therefore, the reactor is more advantageous in view of design than reactors having conventional structures. Further, the reactor has a structure in which the gaps are disposed to obtain inductances, and therefore, control winding is unnecessary. Therefore, the three-phase reactor can be formed to be lightweight and simple.

In the second aspect of the present invention, the number of the iron-core coils is intended to be a multiple of 3, and therefore, the plural iron-core coils exist for one phase. The cross-sectional area of each of the iron-core coils can be reduced by connecting the plural iron-core coils in parallel to each other. The winding number of each of the iron-core coils can be reduced by connecting the plural iron-core coils in series to each other.

In the third aspect of the present invention, both the gaps between the iron-core coils and the iron-core unit gaps between the plural iron-core units are formed, and therefore, the dimension of each gap per site can be reduced. As a result, magnetic fluxes leaking out of the gaps can be reduced, and therefore, eddy-current losses in the coils, caused by the magnetic leakage fluxes, can be reduced.

In the fourth aspect of the present invention, the outer peripheral iron-core gaps are formed between the outer peripheral iron core and the iron-core coils, and therefore, heat generated from the iron-core coils is inhibited from being transferred to the outer peripheral iron core.

In the fifth embodiment of the present invention, the outer peripheral iron core is divided into plural units, and therefore, the outer peripheral iron core can be easily manufactured even when the outer peripheral iron core is large.

In the sixth aspect of the present invention, an imbalance in inductances can be easily adjusted by adjusting the outer peripheral iron-core unit gaps.

In the seventh aspect of the present invention, an imbalance in inductances caused by the arrangement of the at least three iron-core coils can be minimized.

In the eighth aspect of the present invention, two reactors can be included in one reactor, and therefore, an installation space can be reduced when two reactors are preferred. Inductance values can be adjusted by connecting the reactors in parallel or series to each other.

In the ninth aspect of the present invention, three or more reactors can be included in one reactor, and therefore, an installation space can be reduced when three or more reactors are preferred. Inductance values can be adjusted by connecting the three or more reactors in parallel or series to each other.

In the tenth aspect of the present invention, vibrations of the iron cores coming in contact with the gaps can be suppressed, and noise generated from the iron cores can be reduced.

In the eleventh aspect of the present invention, temperature equilibrium between the iron-core coils and the outer peripheral iron core can be promoted, and noise generated from the iron-core coils and the outer peripheral iron core can be reduced.

In the twelfth aspect of the present invention, the gaps are formed between the iron-core coils and the inter-coil iron cores, and therefore, each gap per site is narrower than that in the case of the absence of the inter-coil iron cores. Therefore, magnetic fluxes leaking out are small. Because the distances between the gaps and the inter-coils are long, magnetic fluxes penetrating the coils further become small, eddy currents generated in the coils are reduced, and therefore, eddy-current losses occurring in the coils can be reduced.

In the thirteenth aspect of the present invention, because the areas of the gaps are increased, the magnetic flux densities of the gaps are decreased, thereby decreasing magnetic fluxes leaking out, magnetic fluxes penetrating the coils become small, and therefore, eddy-current losses occurring in the coils can be further reduced.

In the fourteenth aspect of the present invention, the number of the iron-core coils is intended to be a multiple of 3, and therefore, the plural iron-core coils exist for one phase. The cross-sectional area of each of the iron-core coils can be reduced by connecting the plural iron-core coils in parallel to each other. The winding number of each of the iron-core coils can be reduced by connecting the plural iron-core coils in series to each other.

In the fifteenth aspect of the present invention, both the gaps between the iron-core coils and the iron-core unit gaps between the plural iron-core units are formed, and therefore, the dimension of each gap per site can be reduced. As a result, magnetic fluxes leaking out of the gaps can be reduced, and therefore, eddy-current losses in the coils, caused by the magnetic leakage fluxes, can be reduced.

In the sixteenth aspect of the present invention, the outer peripheral iron-core gaps are formed between the outer peripheral iron core and the iron-core coils, and therefore, heat generated from the iron-core coils is inhibited from being transferred to the outer peripheral iron core.

In the seventeenth aspect of the present invention, both the gaps between the iron-core coils and the inter-coil iron-core unit gaps are formed, and therefore, the dimension of each gap per site can be reduced. As a result, magnetic fluxes leaking out of the gaps can be reduced, and therefore, eddy-current losses in the coils, caused by the magnetic leakage fluxes, can be further reduced.

In the eighteenth aspect of the present invention, the outer peripheral iron core is divided into plural units, and therefore, the outer peripheral iron core can be easily manufactured even when the outer peripheral iron core is large.

In the nineteenth aspect of the present invention, an imbalance in inductances can be easily adjusted by adjusting the outer peripheral iron-core unit gaps.

In the twentieth aspect of the present invention, an imbalance in inductances caused by the arrangement of the at least three iron-core coils can be minimized.

In the twenty-first aspect of the present invention, two reactors can be included in one reactor, and therefore, an installation space can be reduced when two reactors are preferred. Inductance values can be adjusted by connecting the reactors in parallel or series to each other.

In the twenty-second aspect of the present invention, three or more reactors can be included in one reactor, and therefore, an installation space can be reduced when three or more reactors are preferred. Inductance values can be adjusted by connecting three or more reactors in parallel or series to each other.

In the twenty-third aspect of the present invention, vibrations of the iron cores coming in contact with the gaps, and the inter-coil iron cores can be suppressed, and noise generated from the iron cores can be reduced.

In the twenty-fourth aspect of the present invention, temperature equilibrium between the iron-core coils, the outer peripheral iron cores, and the inter-coil iron cores can be promoted, and noise generated from the iron-core coils, the outer peripheral iron cores, and the inter-coil iron cores can be reduced.

In the twenty-fifth to twenty-eighth aspects of the present invention, the motor driving device including the reactor, the machine including such a motor driving device, the power conditioner including the reactor, and the machine or device including such a power conditioner can be easily provided.

Although the present invention has been described with reference to the exemplary embodiments, persons skilled in the art will understand that the changes described above as well as various other changes, omissions, and additions may be made without departing from the scope of the present invention.

The invention claimed is:

1. A three-phase reactor comprising:
an outer peripheral iron core; and
at least three iron-core coils that come in contact with an inner surface of the outer peripheral iron core or are joined to the inner surface,
wherein the at least three iron-core coils comprise corresponding iron cores and corresponding coils wound around the iron cores;
each of the iron cores extends only in a radial direction of the outer peripheral iron core; the three-phase reactor further comprises a plurality of inter-coil iron cores arranged between the at least three iron-core coils, wherein the cross sections of each of the plurality of inter-coil iron cores are pentagons of which two sides are parallel to each other; and gaps that-can magnetically connect the at least three iron-core coils and the plurality of inter-coil iron cores to each other are formed between the at least three iron-core coils and the inter-coil iron cores, wherein the plurality of inter-coil iron cores are arranged radially inward of the radially inner ends of the iron cores.

2. The three-phase reactor according to claim 1, wherein the number of the at least three iron-core coils is a multiple of 3.

3. The three-phase reactor according to claim 1, wherein the at least three iron- core coils are rotationally symmetrically arranged.

4. The three-phase reactor according to claim 1, wherein a gap member, insulating paper, or resin which is a non- magnetic material is inserted or filled into the gaps of the three-phase reactor.

\*    \*    \*    \*    \*